United States Patent
Wang et al.

(10) Patent No.: US 11,232,156 B1
(45) Date of Patent: Jan. 25, 2022

(54) SEED EXPANSION IN SOCIAL NETWORK USING GRAPH NEURAL NETWORK

(71) Applicant: FUJITSU LIMITED, Kawasaki (JP)

(72) Inventors: Jun Wang, San Jose, CA (US); Kanji Uchino, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 22 days.

(21) Appl. No.: 16/947,299

(22) Filed: Jul. 28, 2020

(51) Int. Cl.
G06F 16/903 (2019.01)
G06F 16/906 (2019.01)
G06F 16/9035 (2019.01)
G06F 17/18 (2006.01)
G06F 16/901 (2019.01)
G06N 3/08 (2006.01)

(52) U.S. Cl.
CPC ...... G06F 16/90335 (2019.01); G06F 16/906 (2019.01); G06F 16/9024 (2019.01); G06F 16/9035 (2019.01); G06F 17/18 (2013.01); G06N 3/08 (2013.01)

(58) Field of Classification Search
CPC ............ G06F 16/90335; G06F 16/906; G06F 16/9035; G06F 16/9024; G06F 17/18; G06N 3/08
USPC ........................................................ 707/723
See application file for complete search history.

(56) References Cited

U.S. PATENT DOCUMENTS

2015/0120713 A1* 4/2015 Kim .................. H04L 67/10
707/723
2017/0357890 A1* 12/2017 Kim .................. G06F 40/30
2019/0087499 A1* 3/2019 Wang ............... G06F 16/9535
2019/0391796 A1* 12/2019 Brady ................. G06F 8/458

OTHER PUBLICATIONS

Brockschmidt, Marc, "GNN-FiLM", arXiv, Cornell University, Doc. Id. arXiv: 19061.12192v1, Jun. 28, 2019, pp. 1-8.*
Whang, Joyce Jiyoung, et al., "Overlapping Community Detection Using Neighborhood-Inflated Seed Expansion", IEEE Transactions on Knowledge and Data Engineering, vol. 28, No. 5, May 2016, pp. 1272-1284.*
Ke Q, Ahn Y-Y, Sugimoto CR (2017) A systematic identification and analysis of scientists on Twitter. PLoS ONE 12(4):e0175368. https://doi.org/10.1371/journal.pone.0175368, 17 pages.

(Continued)

*Primary Examiner* — Robert Stevens
(74) *Attorney, Agent, or Firm* — Fujitsu Patent Center

(57) ABSTRACT

A method includes seed expansion using Graph Neural Network (GNN). The method includes retrieving a first plurality of seed accounts based on a first user input indicative of domain-specific information associated with the first plurality of seed accounts. The method further includes determining a second plurality of seed accounts based on the first plurality of seed accounts associated with the domain-specific information, for training a GNN. The method further includes updating the retrieved first plurality of seed accounts and the determined second plurality of seed accounts based on the trained GNN. The method further includes generating a final set of seed accounts associated with the domain-specific information, based on an application of a predefined ranking criteria on the updated first plurality of seed accounts and the second plurality of seed accounts. The method further includes controlling a display screen to output the generated final set of seed accounts.

21 Claims, 11 Drawing Sheets

(56) References Cited

OTHER PUBLICATIONS

Hadgu, Asmelash Teka & Jäschke, Robert. (2014). Identifying and analyzing researchers on twitter. 10.1145/2615569.2615676, 10 pages.

Wang, Jun & Xiang, Junfu & Zhang, Yun & Uchino, Kanji. (2017). Mining Domain-Specific Accounts for Scientific Contents from Social Media. 111-118. 10.1007/978-3-319-66733-1_12, 7 pages.

Isabel M. Kloumann and Jon M. Kleinberg. 2014. Community membership identification from small seed sets. In Proceedings of the 20th ACM SIGKDD international conference on Knowledge discovery and data mining (KDD '14). Association for Computing Machinery, New York, NY, USA, 1366-1375. DOI:https://doi.org/10.1145/2623330.2623621.

Andrew Mehler and Steven Skiena. Expanding network communities from representative examples. ACM Trans. Knowl. Discov. Data 3, 2, Article 7 (Apr. 2009), 27 pages. DOI:https://doi.org/10.1145/1514888.1514890.

\* cited by examiner

1000A

| Name | Account | Importance Score | Indegree | Outdegree | Indegree/Outdegree |
|---|---|---|---|---|---|
| NameA | @personA | $4.72 \times 10^{3}$ | 2852 | 46.6K | $6.13 \times 10^{-2}$ |
| NameB | @personB | $3.20 \times 10^{3}$ | 2046 | 23.7K | $8.64 \times 10^{-2}$ |
| NameC | @personC | $2.15 \times 10^{3}$ | 1607 | 8668 | $1.85 \times 10^{-1}$ |

| Photo | Name | Account | Mutually Reinforcing Ranking (MRR) | Total Publication | Average Position |
|---|---|---|---|---|---|
| 👤 | NameA | @personA | 0.036 | 406.489 | 2.352 |
| 👤 | NameB | @personB | 0.011 | 74.131 | 2.318 |
| 👤 | NameC | @personC | 0.009 | 61.646 | 2.615 |

*FIG. 10B*

SEED EXPANSION IN SOCIAL NETWORK USING GRAPH NEURAL NETWORK

FIELD

The embodiments discussed in the present disclosure are related to seed expansion in a social network using a graph neural network.

BACKGROUND

With advancement in computer technology, there is a rapid increase in information available for people across globe. For example, various experts may share and/or exchange information associated with a particular domain of interest (for example related to science, entertainment, health, art, politics, etc.) through various websites (such as, social media websites or publication websites). Generally, a user or a researcher may require contact information (for example account details) associated with a number of such experts of the particular domain of interest. In certain solutions, the user or researcher may manually search the websites (for example social networks or publication websites) to find such experts to extract relevant information associated with the particular domain of interest. The manual process of search may be time consuming and cumbersome in case a large amount of the contact information available on the social networks. Generally, such domain experts may have a corresponding social media account associated therewith, and the social media accounts may be connected to each other through social networks. Certain solutions may enable to identify such accounts associated with different experts and connected through the social networks. In such solutions, the accounts may be identified based on a structure (such as, graphic representation) of the social networks and various heuristic rules (such as, manual selection based on human judgement). Such solutions may miss the identification of relevant experts which may be hidden (such as, unlabeled social media accounts). Thus, there is a need for an enhanced method to search the social networks in order to identify relevant experts associated with the domain of interest in an effective and reliable manner.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may be provided. The method may include retrieving, from one or more websites, a first plurality of seed accounts based on a first user input. The first user input may indicate domain-specific information associated with the first plurality of seed accounts. The method may further include determining a second plurality of seed accounts based on the first plurality of seed accounts associated with the domain-specific information. The second plurality of seed accounts may be determined for training a graph neural network (GNN). The method may further include updating the retrieved first plurality of seed accounts and the determined second plurality of seed accounts based on the trained GNN. The method may further include generating a final set of seed accounts associated with the domain-specific information, based on an application of a predefined ranking criteria on the updated first plurality of seed accounts and the second plurality of seed accounts. The method may further include controlling a display screen to output the generated final set of seed accounts.

According to an aspect of another embodiment, a method may be provided. The method may include extracting, from one or more websites, a first plurality of seed accounts and a second plurality of seed accounts, related to the first plurality of seed accounts, based on domain-specific information. The first plurality of seed accounts and the second plurality of seed accounts may be extracted for training a graph neural network (GNN). The method may further include encoding one or more features of each of the first plurality of seed accounts and each of the second plurality of seed accounts to generate a first vector. The one or more features may correspond to at least one of: a profile description, connection information, or a profile URL. The method may further include selecting a new seed account different from the first plurality of seed accounts and the second plurality of seed accounts. The method may further include extracting, from the one or more websites, a plurality of neighbor seed accounts for the selected new seed account. The method may further include generating a second vector for the selected new seed account based on the extracted plurality of neighbor seed accounts using the trained GNN. The method may further include determining the selected new seed account as a domain-specific seed account or as a non-domain specific seed account based on the generated first vector and the generated second vector. The method may further include updating the first plurality of seed accounts and the second plurality of seed accounts based on the determined new seed account as the domain-specific seed account or as the non-domain specific seed account.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 10A, and 10B, collectively illustrate, exemplary user interface (UI) that may display a final set of seed accounts based on the predefined ranking criteria, all according to at least one embodiment described in the present disclosure.

DESCRIPTION OF EMBODIMENTS

Figure 1:
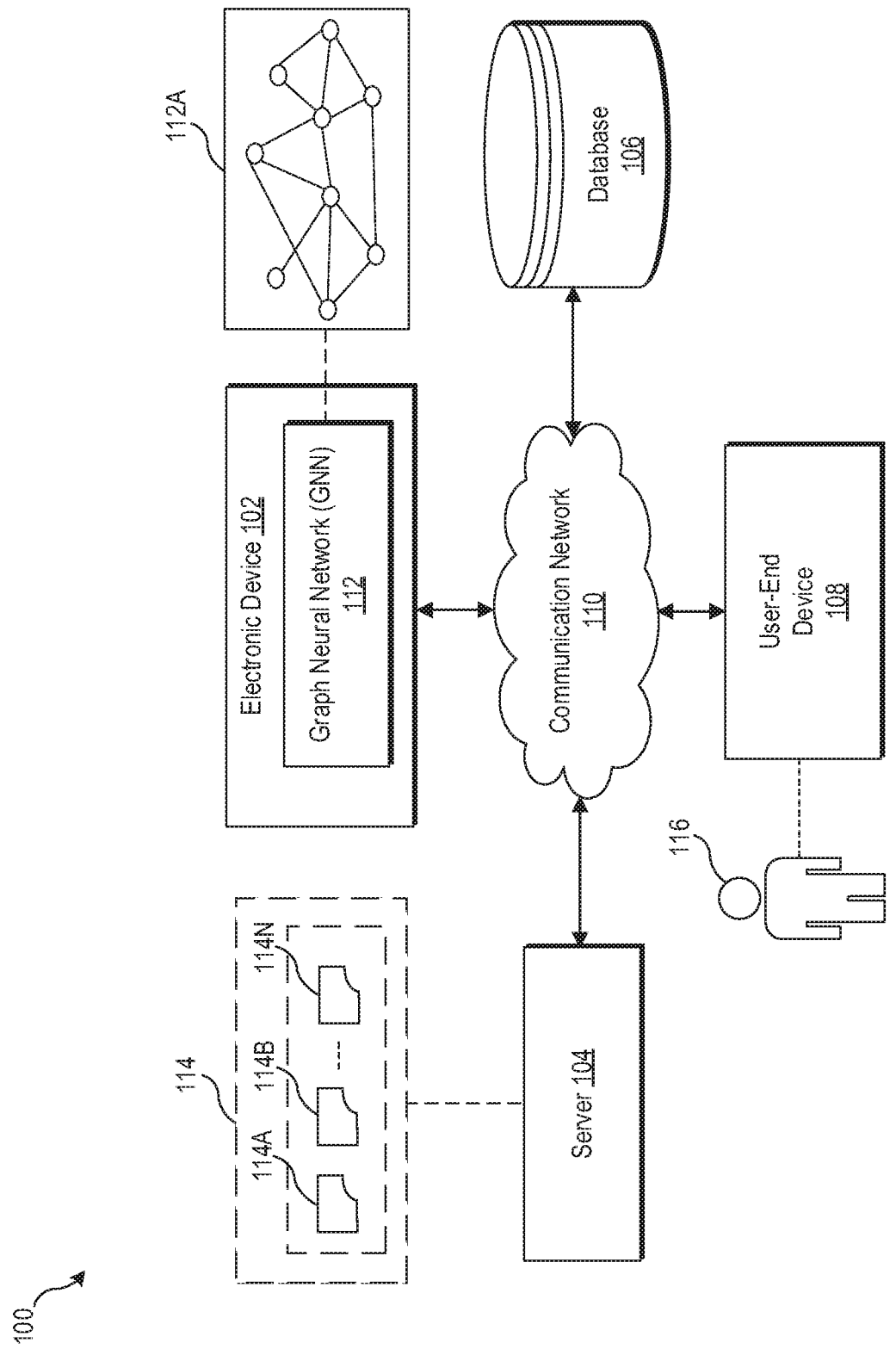
FIG. 1 is a diagram representing an example environment related to seed expansion in social network using a graph neural network (GNN)

Some embodiments described in the present disclosure relate to methods and systems for automated seed expansion using graph neural network (GNN). In the present disclosure, a first plurality of seed accounts (for example, accounts or profiles on one or more social networks) may be retrieved from one or websites based on a first user input. The first user input may be indicative of domain-specific information associated with the first plurality of seed accounts. Herein, the domain-specific information may correspond to a domain of interest of a user or a researcher. Further, the domain-specific information may correspond to different topics or fields of various domains, such as, but are not limited to a science domain, a robotic domain, a medical domain, a sport domain, an entertainment domain, a political domain, a cultural domain, a sales/marketing domain, or a financial domain. Further, a second plurality of seed accounts (for example, additional accounts on the one or more social networks) may be determined based on the retrieved first plurality of seed accounts for training a GNN. The first plurality of seed accounts and the second plurality of seed accounts may be connected or related to each other in the one or more social networks through a graphical representation. Herein, the second plurality of seed accounts may correspond to a training set for the GNN. Based on the trained GNN, the first plurality of seed accounts and the second plurality of seed accounts may be updated. Herein, a new set of domain-specific seed accounts may be added to the first plurality of seed accounts and the second plurality of seed accounts using the trained GNN in order to provide seed expansion. A final set of seed accounts may be generated based on an application of a predefined ranking criteria on the updated first plurality of seed accounts and the second plurality of seed accounts. A display screen may be further controlled to output the generated final set of seed accounts.

In another embodiment described in the present disclosure relates to methods and systems for automated update or expansion of seed accounts using GNN. In the present disclosure, a first plurality of seed accounts and a second plurality of seed accounts (i.e. related to the first plurality of seed accounts) may be extracted from one or more websites (like one or more social networks) based on the domain-specific information. The first plurality of seed accounts and the second plurality of seed accounts may be connected or related to each other in the one or more social networks through a graphical representation. The first plurality of seed accounts and the second plurality of seed accounts may be extracted for training a GNN. Further, one or more features (such as profile information, connections between accounts, or URL of accounts/profiles) of each of the first plurality of seed accounts and each of the second plurality of seed accounts may be encoded to generate a first vector. Further, a new seed account different from the first plurality of seed accounts and the second plurality of seed accounts may be selected and a plurality of neighbor seed accounts of the selected new seed account may be extracted from the one or more websites. Further, a second vector for the selected new seed account may be generated, based on the extracted plurality of neighbor seed accounts using the trained GNN. Based on the generated first vector and the generated second vector, the selected new seed account may be determined as a domain-specific seed account or as a non-domain specific seed account. Further, the first plurality of seed accounts and the second plurality of seed accounts may be updated (as seed expansion) based on the determined new seed account as the domain-specific seed account or as the non-domain specific seed account. The GNN may be further re-trained based on the updated or expanded seed accounts.

According to one or more embodiments of the present disclosure, the technological field of seed account expansion may be improved by configuring a computing system in a manner that the computing system may be able to automatically retrieve the first plurality of seed accounts and the second plurality of seed accounts (related to the first plurality of seed accounts) based on the domain-specific information (i.e. different topics of interest for a user) and train the GNN based on the retrieved first plurality of seed accounts and the retrieved second plurality of seed accounts to output a final set of seed accounts. The retrieval of the first plurality of seed accounts and the retrieval of second plurality of seed accounts may be done based on analysis of network structures of the one or more social networks (i.e. social network connections between different seed accounts) and additional analysis of account profile information (i.e. profile description, domain-specific information, profile URL, or information about followers or following accounts) of the seed accounts. The computing system may automatically retrieve the first plurality of seed accounts and the second plurality of seed accounts from one or more websites based on the domain-specific information, as compared to other conventional solutions which may require significant manual inputs and effort to search and filter the seed accounts associated with the domain-specific information from various websites. The computing system may automatically update or provide expansion of seed accounts using GNN, and use the trained GNN to generate a final set of seed accounts, as compared to other conventional solutions which may require only analysis of the network structure of the one or more social networks using various heuristic rules (such as, manual selection).

The system may be configured to retrieve the first plurality of seed accounts from one or more websites, based on a first user input indicative of the domain-specific information. For example, the one or more websites may be a conference website, journal website, or pre-print research paper publisher website, a personal or academic website, or a social media website. Herein, a seed account of the first plurality of seed accounts may include information associated with a researcher or any domain-specific expert. The system may be further configured to determine a second plurality of seed accounts based on the retrieved first plurality of seed accounts associated with the domain-specific information. Herein, the second plurality of seed accounts may be additional accounts which may be determined for training a graph neural network (GNN). In other words, the second plurality of seed accounts may be associated with a training set of the GNN. The system may be further configured to update the retrieved first plurality of seed accounts and the determined second plurality of seed accounts based on the trained GNN. Herein, the update of the retrieved first plurality of seed accounts and the determined second plurality of seed accounts may include addition of a set of seed accounts (for example new seed accounts in the social network) associated with the domain-specific information and/or removal of a set of seed accounts not associated with the domain-specific information. In other words, the update of the retrieved first plurality of seed accounts and the determined second plurality of seed accounts may include the addition of the set of seed accounts that may be domain-specific seed accounts and/or removal of the set of seed accounts that may be non-domain specific seed accounts.

Figure 9:
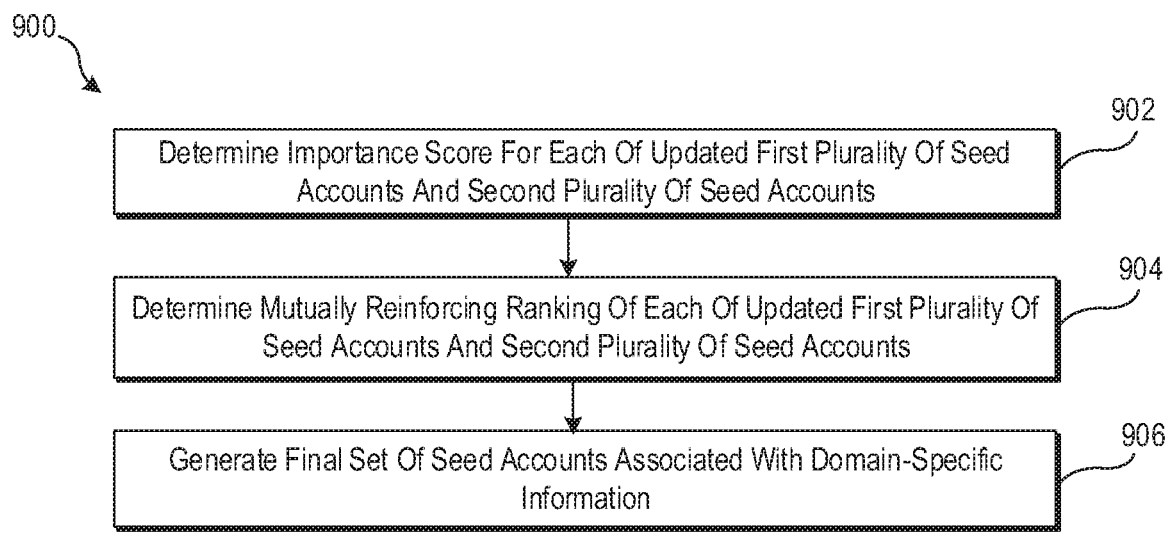
FIG. 9 illustrates a flowchart of an example method for application of a predefined ranking criteria on the generated final set of seed accounts associated with the domain-specific information.

The system may be further configured to generate a final set of seed accounts associated with the domain-specific information, based on an application of a predefined ranking criteria on the updated first plurality of seed accounts and the second plurality of seed accounts, as described, for example, in FIG. 9. The system may be further configured to control a display screen to output the generated final set of seed accounts, as described, for example, in FIGS. 10A and 10B.

According to one or more other embodiments of the present disclosure, the system may be configured to extract, from the one or more websites, the first plurality of seed accounts and the second plurality of seed accounts (i.e. related to the first plurality of seed accounts) based on the domain-specific information. The first plurality of seed accounts and the second plurality of seed accounts may be extracted for training a graph neural network (GNN). The system may be further configured to encode one or more features of each of the first plurality of seed accounts and each of the second plurality of seed accounts to generate a first vector. The one or more features may correspond to at least one of: a profile description, connection information, or a profile URL, as described, for example, in FIGS. 8A and 8B.

The system may be configured to select a new seed account different from the first plurality of seed accounts and the second plurality of seed accounts, and further extract a plurality of neighbor seed accounts, for the selected new seed account, from the one or more websites. Based on the extracted plurality of neighbor seed accounts, the system may be configured to generate a second vector for the selected new seed account using the trained GNN, as described, for example, in FIGS. 8A and 8B.

The system may be further configured to compare the first vector with the second vector for the selected new seed account to determine whether the selected new seed account as the domain-specific seed account or as the non-domain specific seed account. Based on the comparison and determination, the system may be further configured to update the first plurality of seed accounts and the second plurality of seed accounts, as described, for example, in FIGS. 8A and 8B.

Typically, the user may wish to obtain a set of seed accounts of researchers, authors, or scientist associated with the domain of interest, to understand and/or remain updated with the state of art of the domain. However, in the absence of an automation tool (such as the disclosed computing system), the user may need to manually search and retrieve a plurality of seed accounts related to the domain (such as, but not limited to, a science domain, a robotic domain, a medical domain, a sport domain, an entertainment domain, a political domain, a cultural domain, or a financial domain). Such manual approach may be tedious and time consuming as the user may have to manually access multiple websites on the Internet and retrieve the plurality of seed accounts. The user further may have to manually identify whether a given seed account actually corresponds to the domain of interest or not. As may be evident, the manual process of retrieval of the plurality of seed accounts associated with the domain may be time consuming task and may not scale well for a batch of a large number of seed accounts connected through different websites (such as publication websites or social networks). In contrast, the disclosed system may provide automated and enhanced retrieval of the set of seed accounts associated with the domain using GNN, and provide an automated seed expansion using the GNN. Such automatic approach may save significant time of the user to retrieve, identify, discovery, and/or update the set of seed accounts relevant to the domain. The disclosed system may analyze the network structure (i.e. graphical connection of seed accounts), and related account profile information. Using the GNN, the disclosed system may provide an effective and accurate update, expansion, or discovery of seed accounts that may be additional and hidden in the network structure. Such hidden seed accounts may correspond to relevant (i.e. domain-specific seed accounts) seed accounts that may be unlabeled seed accounts in the network structure and identified as noisy seed accounts or missed by existing seed expansion techniques.

Embodiments of the present disclosure are explained with reference to the accompanying drawings.

FIG. 1 is a diagram representing an example environment related to seed expansion in social network using graph neural network (GNN), arranged in accordance with at least one embodiment described in the present disclosure. With reference to FIG. 1, there is shown an environment 100. The environment 100 may include an electronic device 102, a server 104, a database 106, a user-end device 108, and a communication network 110. The electronic device 102, the server 104, the database 106, and the user-end device 108 may be communicatively coupled to each other, via the communication network 110. In FIG. 1, the electronic device 102 may further include a graph neural network (GNN) 112. There is further shown one or more websites 114. The server 104 may host the one or more websites 114. The one or more websites 114 may include a website 114A, a website 114B, . . . and a website 114N. In FIG. 1, there is further shown a user 116 who may be associated with or operating the electronic device 102 or the user-end device 108.

The electronic device 102 may comprise suitable logic, circuitry, interfaces, and/or code that may be configured to retrieve a first plurality of seed accounts from the one or more websites 114 hosted by the server 104 or other servers (not shown), based on a first user input. For example, the one or more websites 114 may include, but are not limited to, a conference website, journal website, or pre-print research paper publisher website, a personal or academic website, or a social network website. The first user input may be indicative of the domain-specific information associated with the first plurality of seed accounts. Further, the domain-specific information may correspond to different topics or fields of various domains. The electronic device 102 may be further configured to determine a second plurality of seed accounts (i.e. additional seed accounts) based on the first plurality of seed accounts associated with the domain-specific information. Herein, the second plurality of seed accounts may be determined for training the GNN 112. The determination or discovery of the second plurality of seed accounts (i.e. relevant in a domain mentioned by the domain-specific information) based on the first plurality of seed accounts is described, for example, in FIG. 6.

Figure 8A:
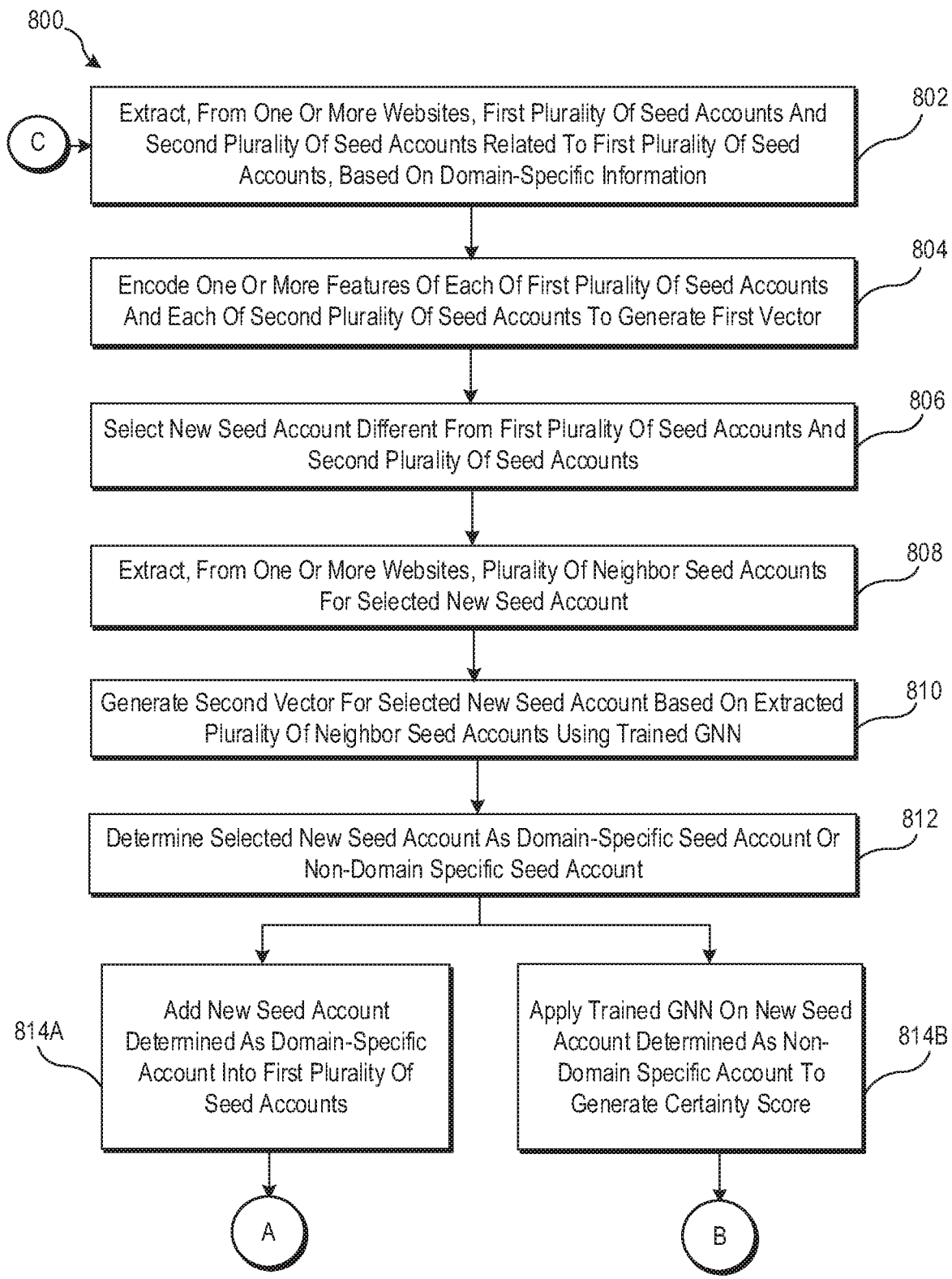
FIGS. 8A, and 8B, collectively illustrate a flowchart of an example method for generation of a final set of seed accounts associated with the domain-specific information.
Figure 8B:
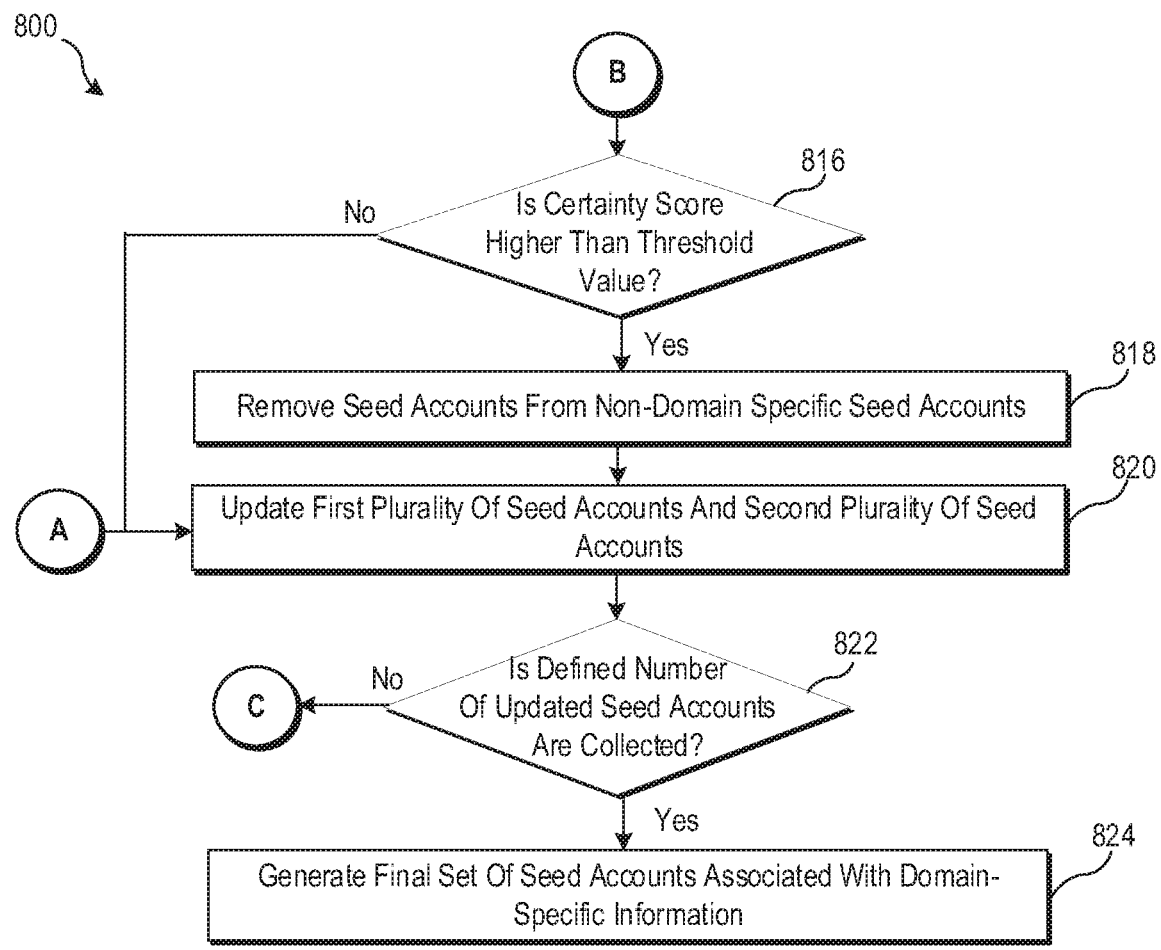

The electronic device 102 may be further configured to update the retrieved first plurality of seed accounts and the determined second plurality of seed accounts based on the trained GNN 112, as described, for example, in FIGS. 8A and 8B. The electronic device 102 may be further configured to generate a final set of seed accounts associated with the domain-specific information, based on an application of a predefined ranking criteria on the updated first plurality of seed accounts and the second plurality of seed accounts. In an example, the predefined ranking criteria may include an importance score and a mutually reinforcing ranking for each of the updated first plurality of seed accounts and the second plurality of seed accounts, as described, for example, in FIG. 9.

In another embodiment, the electronic device 102 may be configured to extract, from the one or more websites 114 or from the server 104, the first plurality of seed accounts and the second plurality of seed accounts (i.e. additional accounts related to the first plurality of seed accounts) based on the domain-specific information indicated by the first user input. The first plurality of seed accounts and the second plurality of seed accounts may be extracted or retrieved for training the graph neural network (GNN) 112. The first plurality of seed accounts and the second plurality of seed accounts may be represented in form of a graph (such as a graph 112A) provided to the GNN112. The electronic device 102 may be further configured to encode one or more features of each of the first plurality of seed accounts and each of the second plurality of seed accounts to generate a first vector. The one or more features may correspond to at least one of: a profile description, connection information, or a profile URL, of the seed accounts.

The electronic device 102 may be further configured to select a new seed account (for example from the one or more websites 114, like social network) different from the first plurality of seed accounts and the second plurality of seed accounts. The electronic device 102 may be further configured to extract, from the one or more websites 114, a plurality of neighbor seed accounts for the selected new seed account (i.e. current account). The electronic device 102 may be further configured to generate a second vector for the selected new seed account based on the extracted plurality of neighbor seed accounts using the trained GNN 112, as further described, for example, in FIGS. 8A and 8B. The electronic device 102 may be further configured to determine the selected new seed account as a domain-specific seed account or as a non-domain specific seed account, and update the first plurality of seed accounts and the second plurality of seed accounts based on the determination, for further training the GNN 112, as described, for example, in FIGS. 8A and 8B.

Examples of the electronic device 102 may include, but are not limited to, a web wrapper device, a web search device, a search engine, a mobile device, a desktop computer, a laptop, a computer work-station, a computing device, a mainframe machine, a server, such as a cloud server, and a group of servers. In one or more embodiments, the electronic device 102 may include a user-end terminal device and a server communicatively coupled to the user-end terminal device. The electronic device 102 may be implemented using hardware including a processor, a microprocessor (e.g., to perform or control performance of one or more operations), a field-programmable gate array (FPGA), or an application-specific integrated circuit (ASIC). In some other instances, the electronic device 102 may be implemented using a combination of hardware and software.

The graph neural network (GNN) 112 may comprise suitable logic, circuitry, interfaces, and/or code that may configured to classify or analyze input graph data (for example a social media network or the graph 112A) to generate an output result for a particular real-time application. For example, a trained GNN 112 may recognize different nodes (such as, seed accounts like the first plurality of seed accounts and/or the second plurality of seed accounts) in the input graph data, and edges between each node in the input graph data. The edges may correspond to different connections or relationship between each node in the input graph data (e.g. graph 112A). Based on the recognized nodes and edges, the trained GNN 112 may classify different nodes within the input graph data, into different labels or classes. In an example, the trained GNN 112 related to an application of content recommendation, may use classification of the different nodes to determine the domain of interest (e.g., machine learning or various topics of different domains) for a particular node within the input graph data, in order to recommend the content to the particular node. In an example, a particular node (such as, a seed account) of the input graph data may include a set of features associated therewith. The set of features may include, but are not limited to, a profile description of the seed account, content publications associated with the seed account, connection information (such as, a set of seed accounts that may be followed by the seed account or a set of seed accounts that may follow the seed account). Further, each edge may connect with different nodes having similar set of features. The electronic device 102 may be configured to encode the set of features to generate a feature vector using GNN 112. After the encoding, information (such as, a message) may be passed between the particular node and the neighboring nodes connected through the edges. Based on the information passed to the neighboring nodes, a final vector may be generated for each node. Such final vector may include information associated with the set of features for the particular node as well as the neighboring nodes, thereby providing reliable and accurate information associated with the particular node. As a result, the GNN 112 may provide a stable and efficient expansion of seed accounts. The GNN 112 may be implemented using hardware including a processor, a microprocessor (e.g., to perform or control performance of one or more operations), a field-programmable gate array (FPGA), or an application-specific integrated circuit (ASIC). In some other instances, the GNN 112 may be a code, a program, or set of software instruction. The GNN 112 may be implemented using a combination of hardware and software.

In some embodiments, the GNN 112 may correspond to multiple classification layers for classification of different nodes in the input graph data, where each successive layer may use an output of a previous layer as input. Each classification layer may be associated with a plurality of edges, each of which may be further associated with plurality of weights. During training, the GNN 112 may be configured to filter or remove the edges or the nodes based on the input graph data and further provide an output result (i.e. a graph representation) of the GNN 112. Examples of the GNN 112 may include, but are not limited to, a graph convolution network (GCN), a Graph Spatial-Temporal Networks with GCN, a recurrent neural network (RNN), a deep Bayesian neural network, and/or a combination of such networks.

The server 104 may comprise suitable logic, circuitry, interfaces, and/or code that may be configured to host one or more websites of a category. For example, the server 104 may host the one or more websites 114 from which the first plurality of seed accounts may be retrieved by the electronic device 102. Examples of the server 104 may include, but are not limited to, a web server, a database server, a file server, a media server, an application server, a mainframe server, or a cloud computing server. In one or more embodiments, the electronic device 102 may include the server 104. The server 104 may be implemented using hardware including a processor, a microprocessor (e.g., to perform or control performance of one or more operations), a field-programmable gate array (FPGA), or an application-specific integrated circuit (ASIC). In some other instances, the server 104 may be implemented using a combination of hardware and software.

The database 106 may comprise suitable logic, interfaces, and/or code that may be configured to store the first plurality of seed accounts that may be retrieved by the electronic device 102 from the one or more websites 114 hosted on the server 104. Further, the database 106 may comprise suitable logic, interfaces, and/or code that may be configured to store the second plurality of seed accounts that may be determined by the electronic device 102 based on the first plurality of seed accounts associated with the domain-specific information. In an embodiment, the database 106 may store a first set of seed accounts and a second set of seed accounts, as described, for example, in FIGS. 6, 7A, and 7B. The database 106 may further store a local connection information and a total connection information associated with the second set of seed accounts. In addition, the database 106 may also store the final set of seed accounts that may displayed on the display screen.

The database 106 may be a relational or a non-relational database. Also, in some cases, the database 106 may be stored on a server, such as a cloud server or may be cached and stored on the electronic device 102. Additionally, or alternatively, the database 106 may be implemented using hardware including a processor, a microprocessor (e.g., to perform or control performance of one or more operations), a field-programmable gate array (FPGA), or an application-specific integrated circuit (ASIC). In some other instances, the database 106 may be implemented using a combination of hardware and software.

The user-end device 108 may comprise suitable logic, circuitry, interfaces, and/or code which may be configured to output the final set of seed accounts. The user-end device 108 may include a web browser software or standalone software to display an integrated UI including final set of seed accounts. In an embodiment, the user-end device 108 may receive a first user input which may indicate the domain-specific information (i.e. domain of interest) associated with the first plurality of seed accounts from the user 116. The user-end device 108 may include a graphical user interface (GUI) to receive the first user input. The user-end device 108 may further provide the first user input to the electronic device 102, via the communication network 110, to automatically search (or discover) the seed accounts and generate the final set of seed accounts related to the domain-specific information indicated in the first user input. The user-end device 108 may further receive the final set of seed accounts from the electronic device 102 based on the provided first user input. The web browser or the standalone software may display an integrated UI including the final set of seed accounts based on the received first user input of the domain-specific information from the user 116. Examples of the user-end device 108 may include, but are not limited to, a web software development or testing device, a search engine device, a mobile device, a desktop computer, a laptop, a computer work-station, a computing device, a mainframe machine, a server, such as a cloud server, and a group of servers. Although in FIG. 1, the user-end device 108 is separated from the electronic device 102; however, in some embodiments, the user-end device 108 may be integrated in the electronic device 102, without a deviation from the scope of the disclosure.

The communication network 110 may include a communication medium through which the electronic device 102 may communicate with the server 104, the server which may store the database 106, and the user-end device 108. Examples of the communication network 110 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to FIG. 1 without departing from the scope of the present disclosure. For example, the environment 100 may include more or fewer elements than those illustrated and described in the present disclosure. For instance, in some embodiments, the environment 100 may include the electronic device 102 but not the database 106 and the user-end device 108. In addition, in some embodiments, the functionality of each of the database 106 and the user-end device 108 may be incorporated into the electronic device 102, without a deviation from the scope of the disclosure.

Figure 2:
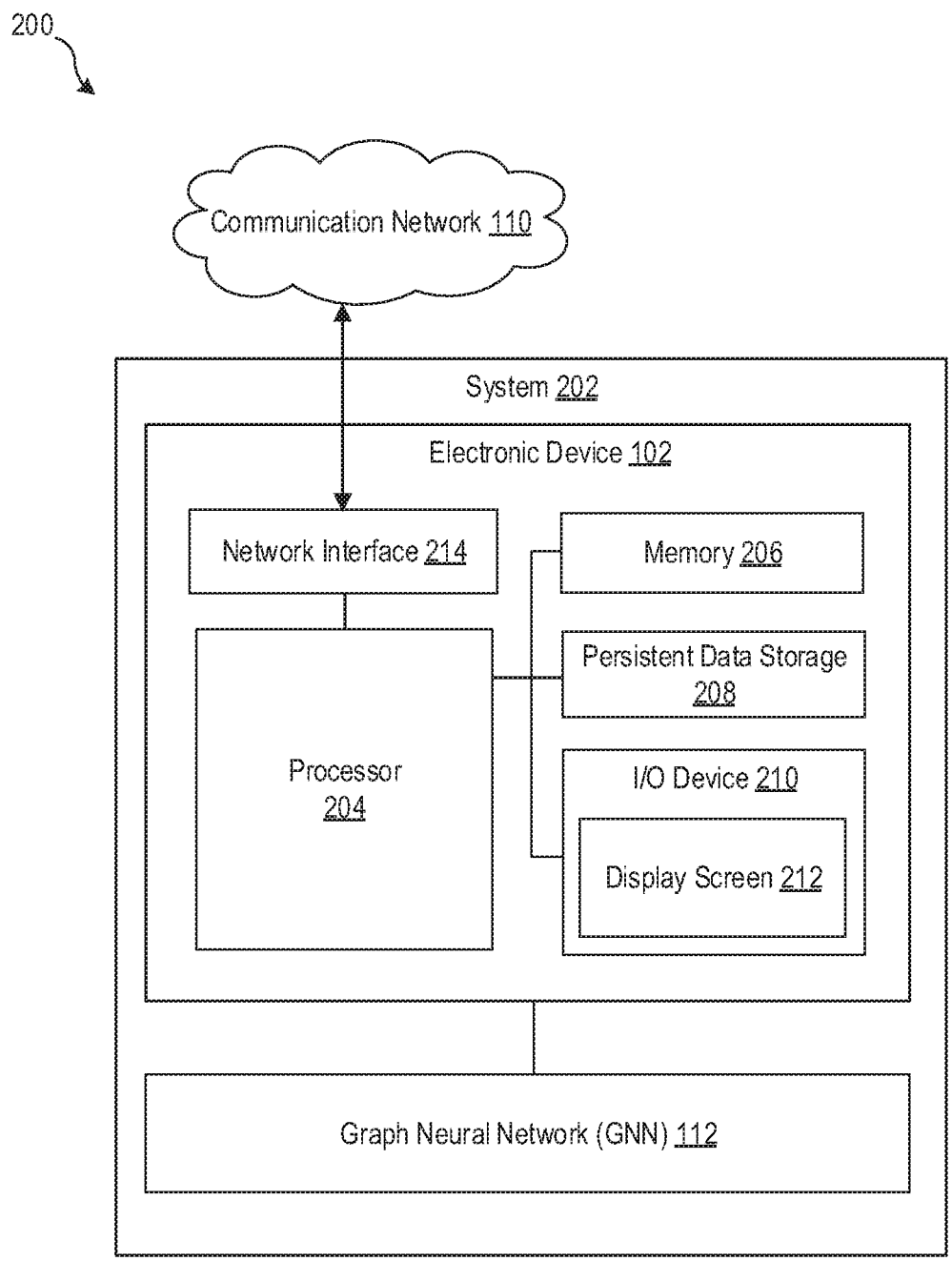
FIG. 2 is a block diagram that illustrates an exemplary electronic device for seed expansion in social network using the GNN.

FIG. 2 is a block diagram that illustrates an exemplary electronic device for seed expansion in social network using GNN, arranged in accordance with at least one embodiment described in the present disclosure. FIG. 2 is explained in conjunction with elements from FIG. 1. With reference to FIG. 2, there is shown a block diagram 200 of a system 202 including the electronic device 102. The electronic device 102 may include a processor 204, a memory 206, a persistent data storage 208, an input/output (I/O) device 210, a display screen 212, and a network interface 214.

The processor 204 may comprise suitable logic, circuitry, and/or interfaces that may be configured to execute program instructions associated with different operations to be executed by the electronic device 102. For example, some of the operations may include retrieving the first plurality of seed accounts, determining the second plurality of seed accounts, and updating the retrieved first plurality of seed accounts and the determined second plurality of seed accounts. The operations may further include extracting the first plurality of seed accounts and the second plurality of seed accounts, encoding one or more features of the first plurality of seed accounts and each of the second plurality of seed accounts, selecting the new seed account, extracting the plurality of neighbor seed accounts, generating the second vector, determining the selected new seed account as the domain-specific seed account or as the non-domain specific seed, and updating the first plurality of seed accounts and the second plurality of seed accounts. The operations may further include generating the final set of seed accounts and controlling the display screen (e.g., the display screen 212) to display the final set of seed accounts. The processor 204 may include any suitable special-purpose or general-purpose computer, computing entity, or processing device including various computer hardware or software modules and may be configured to execute instructions stored on any applicable computer-readable storage media. For example, the processor 204 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers. In some embodiments, the processor 204 may be configured to interpret and/or execute program instructions and/or process data stored in the memory 206 and/or the persistent data storage 208. In some embodiments, the processor 204 may fetch program instructions from the persistent data storage 208 and load the program instructions in the memory 206. After the program instructions are loaded into the memory 206, the processor 204 may execute the program instructions. Some of the examples of the processor 204 may be a GPU, a CPU, a RISC processor, an ASIC processor, a CISC processor, a co-processor, and/or a combination thereof.

The memory 206 may comprise suitable logic, circuitry, interfaces, and/or code that may be configured to store program instructions executable by the processor 204. In certain embodiments, the memory 206 may be configured to store operating systems and associated application-specific information. The memory 206 may include computer-readable storage media for carrying or having computer-executable instructions or data structures stored thereon. Such computer-readable storage media may include any available media that may be accessed by a general-purpose or special-purpose computer, such as the processor 204. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

The persistent data storage 208 may comprise suitable logic, circuitry, interfaces, and/or code that may be configured to store program instructions executable by the processor 204, operating systems, and/or application-specific information, such as logs and application-specific databases. The persistent data storage 208 may include computer-readable storage media for carrying or having computer-executable instructions or data structures stored thereon. Such computer-readable storage media may include any available media that may be accessed by a general-purpose or a special-purpose computer, such as the processor 204.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer.

Combinations of the above may also be included within the scope of computer-readable storage media. Computer-executable instructions may include, for example, instructions and data configured to cause the processor 204 to perform a certain operation or group of operations associated with the electronic device 102.

In some embodiments, either of the memory 206, the persistent data storage 208, or combination may store the first plurality of seed accounts, the second plurality of seed accounts, and the final set of seed accounts. Either of the memory 206, the persistent data storage 208, or combination may further store the first set of seed accounts, the second set of seed accounts, a profile description, the local connection information and the total connection information associated with the second set of seed accounts.

The I/O device 210 may include suitable logic, circuitry, interfaces, and/or code that may be configured to receive a user input. For example, the I/O device 210 may receive the user input (for example the first user input) indicating the domain-specific information or the name of the author of one or more seed accounts in the social network. The I/O device 210 may be further configured to provide an output in response to the user input. For example, the output may include the integrated UI that may display the final set of seed accounts. The I/O device 210 may include various input and output devices, which may be configured to communicate with the processor 204 and other components, such as the network interface 214. Examples of the input devices may include, but are not limited to, a touch screen, a keyboard, a mouse, a joystick, and/or a microphone. Examples of the output devices may include, but are not limited to, a display and a speaker.

The display screen 212 may comprise suitable logic, circuitry, interfaces, and/or code that may be configured to render the integrated UI that may display the final set of seed accounts which may be additionally discovered or identified from the one or more websites 114 and may be associated with the domain of interest indicated in the first user input provided by the user 116. The display screen 212 may be configured to receive the first user input from the user 116. In such cases the display screen 212 may be a touch screen to receive the first user input (or a second user input). The display screen 212 may be realized through several known technologies such as, but not limited to, a Liquid Crystal Display (LCD) display, a Light Emitting Diode (LED)

display, a plasma display, and/or an Organic LED (OLED) display technology, and/or other display technologies.

The network interface 214 may comprise suitable logic, circuitry, interfaces, and/or code that may be configured to establish a communication between the electronic device 102, the server 104, the database 106, and the user-end device 108, via the communication network 110. The network interface 214 may be implemented by use of various known technologies to support wired or wireless communication of the electronic device 102 via the communication network 110. The network interface 214 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

Modifications, additions, or omissions may be made to the example electronic device 102 without departing from the scope of the present disclosure. For example, in some embodiments, the example electronic device 102 may include any number of other components that may not be explicitly illustrated or described for the sake of brevity.

Figure 3A:
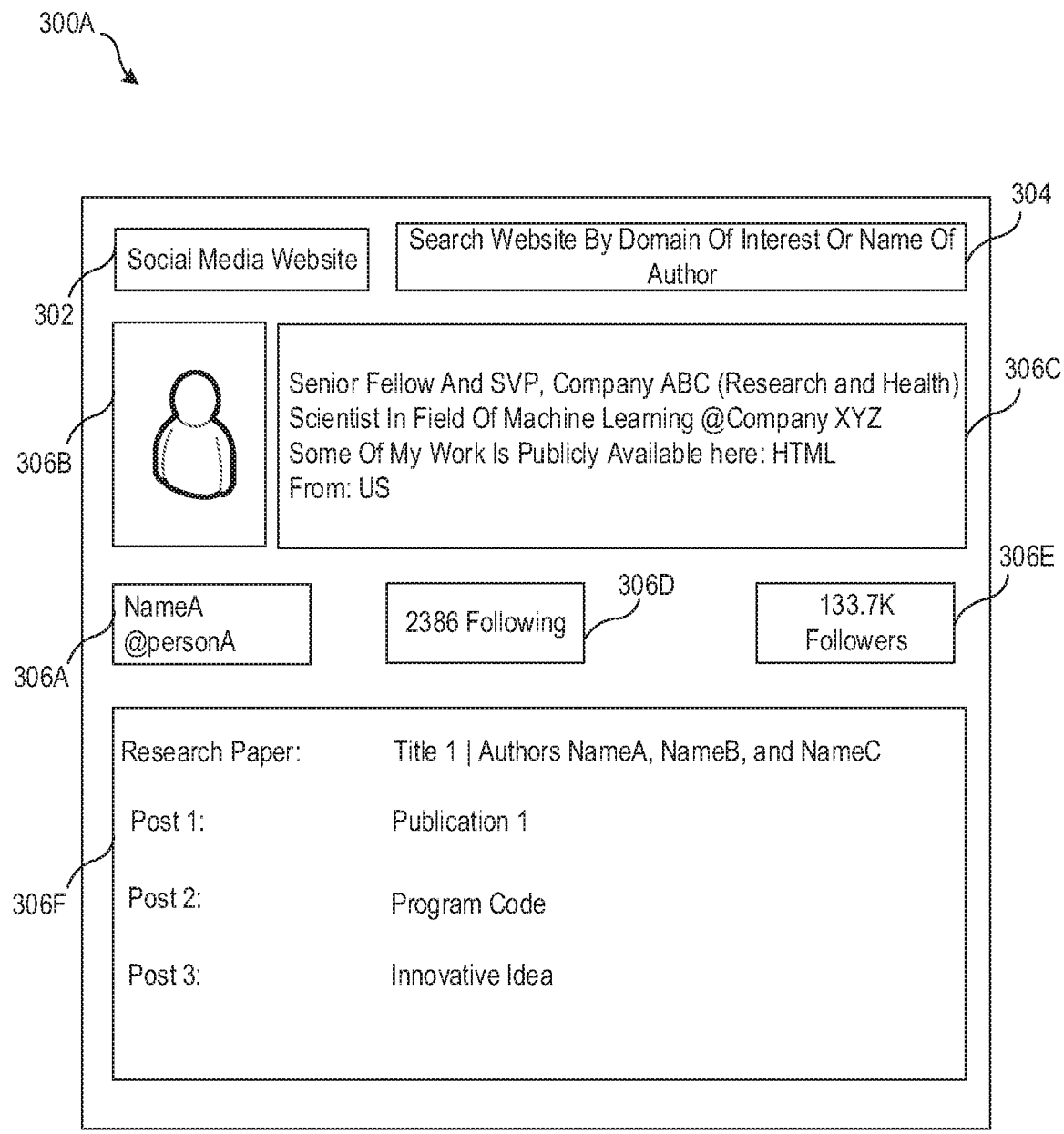
FIGS. 3A and 3B, collectively illustrate, exemplary websites for retrieval of a first plurality of seed accounts and a plurality of second plurality of seed accounts associated with domain-specific information.
Figure 3B:
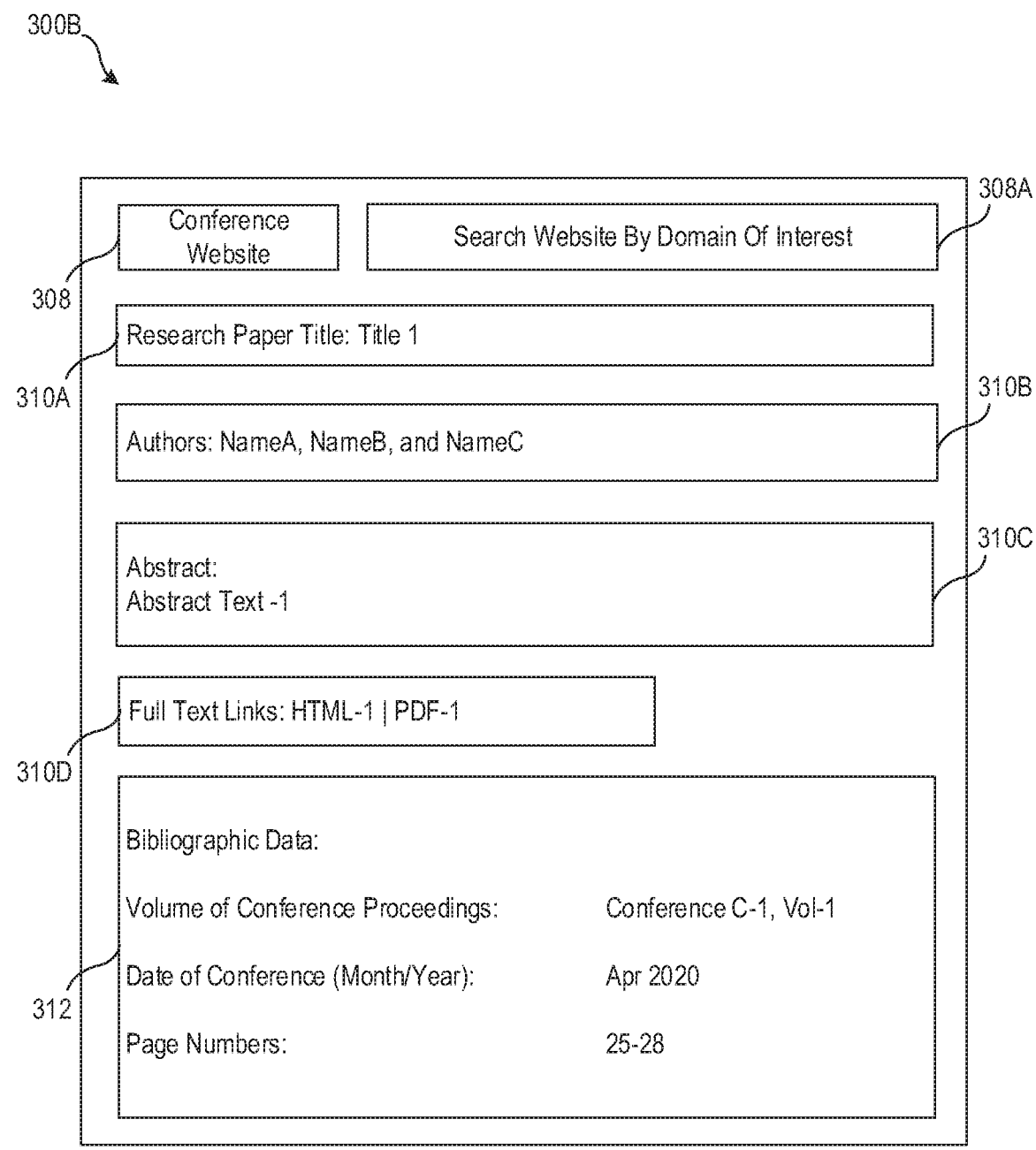

FIGS. 3A, and 3B, collectively illustrate, exemplary websites for retrieval of a first plurality of seed accounts and a plurality of second plurality of seed accounts associated with domain-specific information, arranged in accordance with at least one embodiment described in the present disclosure. FIGS. 3A, and 3B are explained in conjunction with elements from FIG. 1 and FIG. 2.

With reference to FIG. 3A, there is shown a first website 300A. The first website 300A may be a website associated with a social media website. Such websites may provide a personal webpage or a social account of an expert (or an author) associated with the domain-specific information. Further, the domain-specific information may correspond to different topics or fields of various domains, such as, but are not limited to a science domain, a robotic domain, a medical domain, a sport domain, an entertainment domain, a political domain, a cultural domain, a sales/marking domain, or a financial domain The personal webpages or social accounts of the experts or authors (i.e. associated with the domain-specific information) may correspond to the first plurality of seed accounts which may be provided on the one or more websites 114 including the first website 300A. There is shown in FIG. 3A, a name (such as, "Social Media website" denoted by 302) of the first website 300A. The first website 300A may further include a search box (such as, a search box 304) to search for the first plurality of seed accounts associated with the domain-specific information or with a name of the expert/author related to the domain-specific information. Based on the search performed on the search box 304, the first website 300A may provide a web page related to a social account (i.e. or seed account) as shown in FIG. 3A. The web page in the first website 300A may include an author name and/or a username (such as, Author name: "NameA" and username: "@personA" denoted by 306A). The web page of the first website 300A may further include a photo or portrait picture of a user or an account holder of the seed account (such as, a photo 306B). As shown in FIG. 3A, the first website 300A may further include an introduction of the account holder including his/her profession, designation, organization name, affiliation, or academic or personal interests. For example, the introduction of the account holder may be "Senior Fellow And SVP, Company ABC (Research and Health), Scientist In Field Of Machine Learning @Company XYZ, Some Of My Work Is Publicly Available here: HTML-1, From: US", as denoted by 306C in FIG. 3A.

As shown in FIG. 3A, the first website 300A may further include a number of seed accounts which are followed by the current account holder "NameA" (such as, "2386 following" denoted by 306D) and a number of seed accounts which are follower accounts of the current account holder "NameA" (such as, followers: "133.7K followers" denoted by 306E). The webpage of the first website 300A may further include a content published by the account holder on the first website 300A (such as denoted by 306F). Examples of the content published may include, a latest research paper published (e.g., "Title 1|Authors NameA, NameB, and NameC"), a plurality of posts (e.g., "post 1: publication 1", "post 2: a program code", and "post 3: innovative idea"). It may be noted that information (such as search box, username, picture, introductions, following accounts, followers accounts, or content published, shown in FIG. 3, are presented merely as an example. A web page of the social network as the first website 300A, may include other information (for example age, gender, date of birth, marital status, personal interest/hobbies, account joining date, friend list, email address, or other contact details), without any deviation from the scope of the disclosure.

With reference to FIG. 3B, there is shown a second website 300B. The second website 300B may be a website associated with a publication, a conference, or a journal of the domain-specific information, which may be associated with or may store the first plurality of seed accounts. For example, the second website 300B may be referred as a domain-specific publication which may include one or more publications or research papers provided by the experts of different domains (for example related to "machine learning" domain). In FIG. 3B, there is shown, a name (such as, "Conference website", denoted by 308) of the second website 300B. The second website 300B may include a search box (such as, the search box 308A) to search for seed accounts (or social accounts) associated with the domain-specific information through the second website 300B. For example, the second website 300B (i.e. domain-specific publication) or included web page may be related to an author who may also have a social account (i.e. seed account), and information about the seed account may be included on the web page of the second website 300B as shown in FIG. 3B. For example, the electronic device 102 may receive the first user input through the search box 304 from the user 116. The first user input may include the domain-specific information. The second website 300B may search and identify different web pages on the second website 300B about different authors, publications, conferences, or journals related to the domain-specific information and may further identify the seed accounts (i.e. social accounts) from the identified web pages. Such identified seed account may correspond to the first plurality of seed accounts related on the domain-specific information. In an embodiment, the authors or publishers (i.e. related to the domain-specific information) of the identified web pages of the second website 300B may be searched on the social websites (such as the first website 300A) to determine the seed accounts (i.e. first plurality of seed accounts) related on the domain-specific information.

As shown in FIG. 3B, the second website 300B may display a research paper (or publication) related to the domain-specific information. The second website 300B may further display a title associated with the research paper (such as, "Research Paper Title: Title-1" denoted by 310A).

The second website 300B may further display name(s) of author(s) of the searched research paper (such as, "Authors: NameA, NameB, or NameC)" denoted by 310B). The name(s) of author(s) may be related to the first plurality of seed accounts. The second website 300B may further display an abstract of the searched research paper (such as, "Abstract Text-1" denoted by 310C). Further, second website 300B may display a full text of the searched research paper or a link to a file (such as, "Full Text Links: HTML-1|PDF-1" denoted by 310D) including the full text. For example, the second website 300B may display a link to a Hypertext Markup Language (HTML) file (e.g., "HTML-1") of the full text or a link to a Portable Document Format (PDF) file (e.g., "PDF-1") of the full text. The second website 300B may further display bibliographic data (such as, denoted by 312) of the searched research paper or publication. Examples of the bibliographic data may include, a volume of conference proceedings (e.g., "Conference C-1, Volume 1"), a date of publication (e.g., "April 2020"), or page numbers (e.g., "25-28") as shown in FIG. 3B. It should be noted that the first website 300A, and the second website 300B shown in FIGS. 3A and 3B are presented merely as examples and should not be construed to limit the scope of the disclosure.

Figure 4:
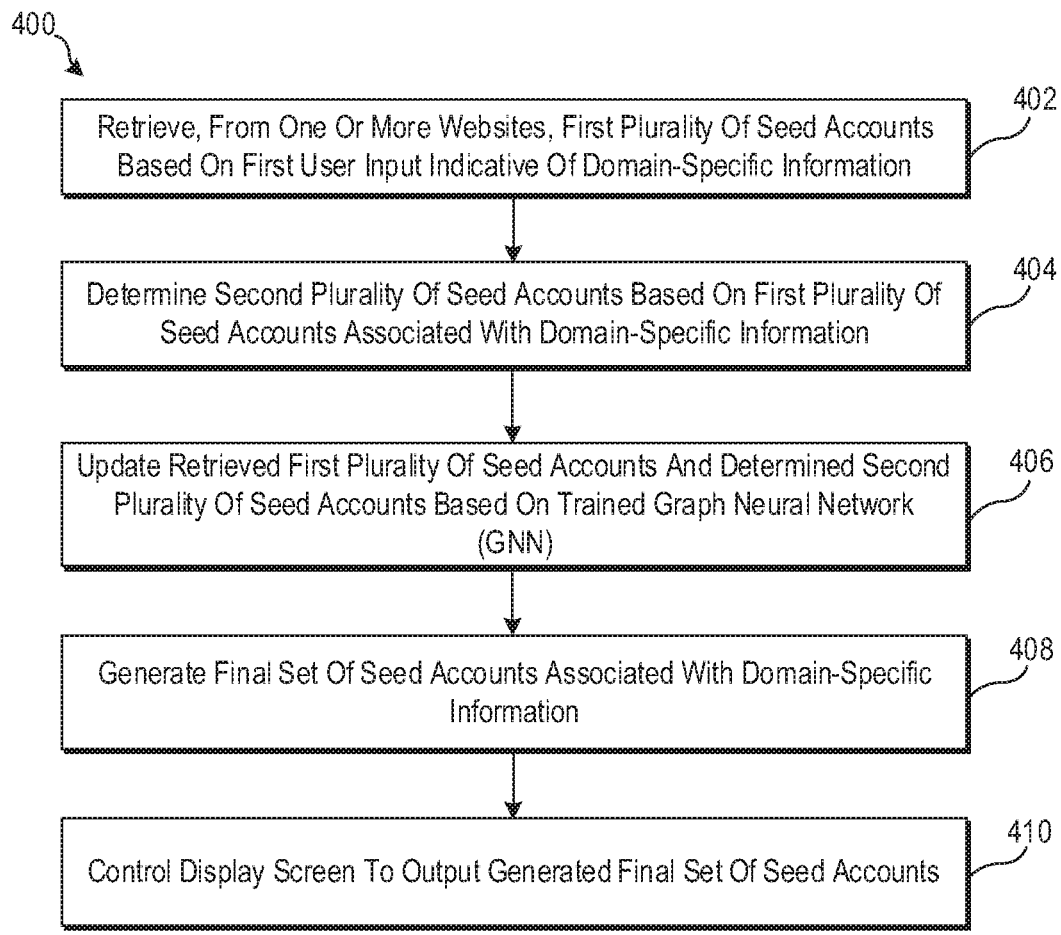
FIG. 4 illustrates a flowchart of an example method for seed expansion in social network using the GNN.

FIG. 4 illustrates a flowchart of an example method for seed expansion in social network using GNN, arranged in accordance with at least one embodiment described in the present disclosure. FIG. 4 is explained in conjunction with elements from FIG. 1, FIG. 2, FIG. 3A, and FIG. 3B. With reference to FIG. 4, there is shown a flowchart 400. The method illustrated in the flowchart 400 may start at 402 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 400 may be divided into additional blocks, combined into fewer blocks, or eliminated, depending on the particular implementation.

At block 402, a first plurality of seed accounts may be retrieved. In an embodiment, the processor 204 may be configured to retrieve, from the one or more websites 114, the first plurality of seed accounts (for example social accounts) based on a first user input. The first user input may indicate domain-specific information associated with the first plurality of seed accounts Herein, the domain-specific information may correspond to a domain of interest of the user 116. Examples of the domain-specific information may include, but are not limited to, a technical domain of interest such as, machine learning, artificial intelligence, or neural network. Another examples of the domain-specific information may include any topic on different domain such as, but is not limited to, a science domain, a robotic domain, a medical domain, a sport domain, an entertainment domain, a political domain, a cultural domain, or a financial domain. In an example, the electronic device 102 may receive the first user input (such as textual input as "Machine Learning") via the I/O device 210 or the display screen 212 from the user 116. In such example, the processor 204 may be further configured to retrieve, from the one or more websites 114, the first plurality of seed accounts associated with the "Machine Learning" domain. The first set of seed accounts may be the social accounts of people who may be an expert or have an interest in the domain of the "Machine Learning" domain. Examples of the one or more websites 114 may include, but are not limited to, a website associated with a publication, a conference, or journal of the domain-specific information (e.g., the second website 300B), or a social network website (e.g., the first website 300A). In an embodiment, the processor 204 may be configured to retrieve the first plurality of seed accounts (associated with the domain-specific information) based on a second user input indicative of a first set of seed accounts, or based on a second user input corresponding to a name of an author related to the domain-specific information, as further described, for example, in FIG. 5.

At block 404, a second plurality of seed accounts may be determined. In an embodiment, the processor 204 may be configured to determine the second plurality of seed accounts based on the first plurality of seed accounts associated with the domain-specific information. The second plurality of seed accounts may be the additional social accounts which may be determined based on the retrieved first plurality of seed accounts. For example, the second plurality of seed accounts may be neighbor accounts (of the first plurality of seed accounts) which may be of the particular domain of interest (i.e. indicated in the first user input). Therefore, the second plurality of seed accounts (i.e. additional seed accounts) may be also associated with the domain-specific information. The second plurality of seed accounts may be determined for training the graph neural network (GNN) (such as, the GNN 112) with additional seed accounts. The trained GNN 112 may be configured to classify each of the determined second plurality of seed accounts and the retrieved first plurality of seed accounts as a domain-specific seed account or a non-domain specific seed account. The determination of the second plurality of seed accounts based on the first plurality of seed accounts is further described, for example, in FIG. 6.

At block 406, the retrieved first plurality of seed accounts and the determined second plurality of seed accounts may be updated. In an embodiment, the processor 204 may be configured to update the retrieved first plurality of seed accounts and the determined second plurality of seed accounts based on the trained GNN 112. The update of the first plurality of seed accounts and the second plurality of seed accounts may correspond to addition of new seed accounts (for example accounts in the domain of interest) determined based on the trained GNN 112, as further described, for example, in FIGS. 8A and 8B.

At block 408, a final set of seed accounts associated with the domain-specific information may be generated. In an embodiment, the processor 204 may be configured to generate the final set of seed accounts associated with the domain-specific information, based on an application of a predefined ranking criteria on the updated first plurality of seed accounts and the second plurality of seed accounts. The predefined ranking criteria may include, but not limited to, determination of a certainty score, determination of an importance score for each of the updated first plurality of seed accounts and the second plurality of seed accounts, or determination of a mutually reinforcing ranking for each the updated first plurality of seed accounts and the second plurality of seed accounts, as further described, for example, in FIGS. 8A, 8B and 9.

At block 410, a display screen may be controlled to output the final set of seed accounts. In an embodiment, the processor 204 may be configured to control the display screen (such as, the display screen 212 of the electronic device 102) to output the determined final set of seed accounts. An exemplary UI that may display the final set of seed accounts is further described, for example, in FIGS. 10A and 10B. Control may pass to end.

Although the flowchart 400 is illustrated as discrete operations, such as 402, 404, 406, 408, and 410. However, in certain embodiments, such discrete operations may be further divided into additional operations, combined into fewer operations, or eliminated, depending on the particular implementation without detracting from the essence of the disclosed embodiments.

Figure 5:
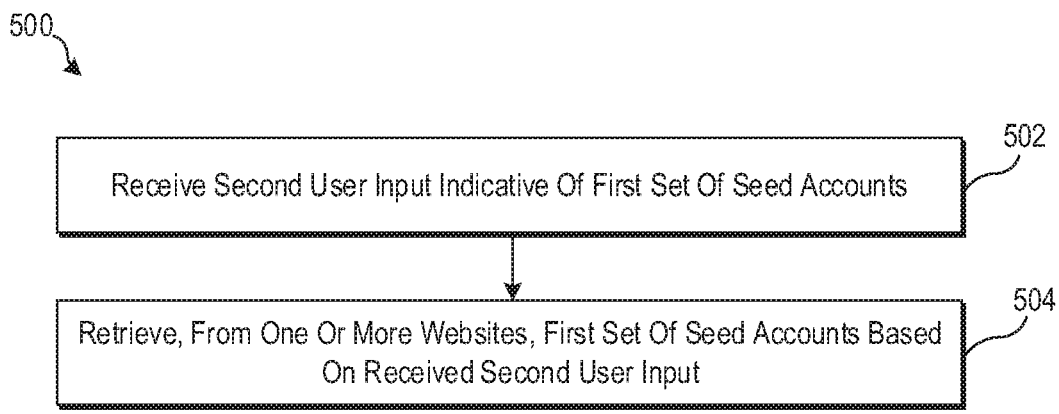
FIG. 5 illustrates a flowchart of an example method for retrieval of a first plurality of seed accounts associated with domain-specific information.

FIG. 5 illustrates a flowchart of an example method for retrieval of a first plurality of seed accounts associated with domain-specific information, arranged in accordance with at least one embodiment described in the present disclosure. FIG. 5 is explained in conjunction with elements from FIG. 1, FIG. 2, FIG. 3A, FIG. 3B, and FIG. 4. With reference to FIG. 5, there is shown a flowchart 500. The method illustrated in the flowchart 500 may start at 502 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 500 may be divided into additional blocks, combined into fewer blocks, or eliminated, depending on the particular implementation.

At block 502, a second user input may be received. In an embodiment, the processor 204 may be configured to receive the second user input which may be indicative of a first set of seed accounts. The processor 204 may be configured to receive the second user input via the I/O device 210 of the electronic device 102. The first set of seed accounts may correspond to a set of seed accounts that may be well known (such as, famous social media accounts) or associated with a particular domain of interest. The first set of seed accounts may be known to the user 116. In other words, the first set of seed accounts may correspond to a set of famous seed accounts associated with the domain-specific information. In an embodiment, the second user input may be a textual input, like names, or account profile names of the first set of seed accounts. For example, the second user input may correspond to names (such as "NameA", "NameB", or "NameC" shown in FIG. 3A) of the social media accounts of people famous for their work in the domain-specific information (for example "machine learning domain").

At block 504, a first set of seed accounts may be retrieved. In an embodiment, the processor 204 may be configured to retrieve, from the one or more websites 114, the first set of seed accounts based on the received second user input. The first plurality of seed accounts may include the first set of seed accounts. In an embodiment, the second user input may be indicative of the set of famous seed accounts. The second user input may be the textual input, like names, or account profile names of the set of famous seed accounts. The processor 204 may be configured to retrieve, from the one or more websites 114, the set of famous seed accounts based on the second user input. The retrieved set of famous seed accounts may correspond to the first set of seed accounts which are included in the first plurality of seed accounts.

In another embodiment, the second user input may correspond to a name of an author related to the domain-specific information. The second user input may be a textual input, like name of an expert of the domain (for example related to "machine learning") or the author of a particular publication in the domain. The processor 204 may be configured to retrieve, from the one or more websites 114 (for example, the first website 300A), a social account associated with the name of the expert or the author indicated in the second user input. The retrieved social account may correspond to a seed account of the first set of seed accounts which are included in the first plurality of seed accounts.

In some embodiments, the processor 204 may be configured to obtain a plurality of digital documents (such as publications, research papers, or lectures) from the one or more websites 114 (such as, the second website 300B associated with a conference website, a journal website or a pre-print research paper publisher) to extract author profile data and topics (such as, the domain-specific information). The author profile data may include, but is not limited to a name of the author, an affiliation of the author, title of the author, co-authors, a document image of the author, and an expertise or interest description of the author (such as, related to "machine learning"). The processor 204 may be further configured to create an author object for each of the plurality of digital documents. The processor 204 may be further configured to obtain a plurality of social media accounts (such as first plurality of seed accounts) in a social media based on a search in the social media (such as, the first website 300A) for a name of the author in the author object. The processor 204 may be configured to create a social media account object for each of the plurality of social media accounts. The processor 204 may be further configured to generate a plurality of scores (such as, a name score, a profile score, a content score, and/or an interaction score) based on a comparison of the author object and the social media account object. For example, the processor 204 may be configured to generate the name score based on a comparison of a name from the author object and a social media name from the social media account object, and generate the profile score based on a comparison of author profile data from the author object and social media profile data from the social media account object. Based on the plurality of scores, processor 204 may be configured to determine if the social media account is associated with the author of the author object. Therefore, in case the author shares content or information on the social media account (such as the first website 300A), where the content or the information may be related to a topic/domain for which the author may have published content (on the second website 300B), the processor 204 may be configured determine the social media account that may be associated with the author of the author object.

For example, FLA15-043, U.S. patent application Ser. No. 15/043,406 filed on Feb. 12, 2016, which is incorporated by reference herein in its entirety, discusses extraction of social media accounts based on author information in detail. It may be noted that methods to extract or obtain the social media accounts based on the author information by the referenced application are merely an example. Although, there may be different other ways to extract information from the social media accounts, without departure from the scope of the disclosure.

In another embodiment, the second user input may be indicative of the domain-specific information. The second user input may be a textual input, like different keywords associated with the domain-specific information (for example, domain name such as "Artificial Intelligence (AI)", or a hashtag related to the domain such as, "#AI"). The processor 204 may be configured to retrieve, from the one or more websites 114 (for example, the first website 300A), the first set of seed accounts associated with the domain-specific information (or keywords) indicated in the second user input. In other words, the processor 204 may be configured to search the textual input on the first website 300A (e.g., the social media website) to retrieve the first set of seed accounts which may be included in the first plurality of seed accounts.

Figure 6:
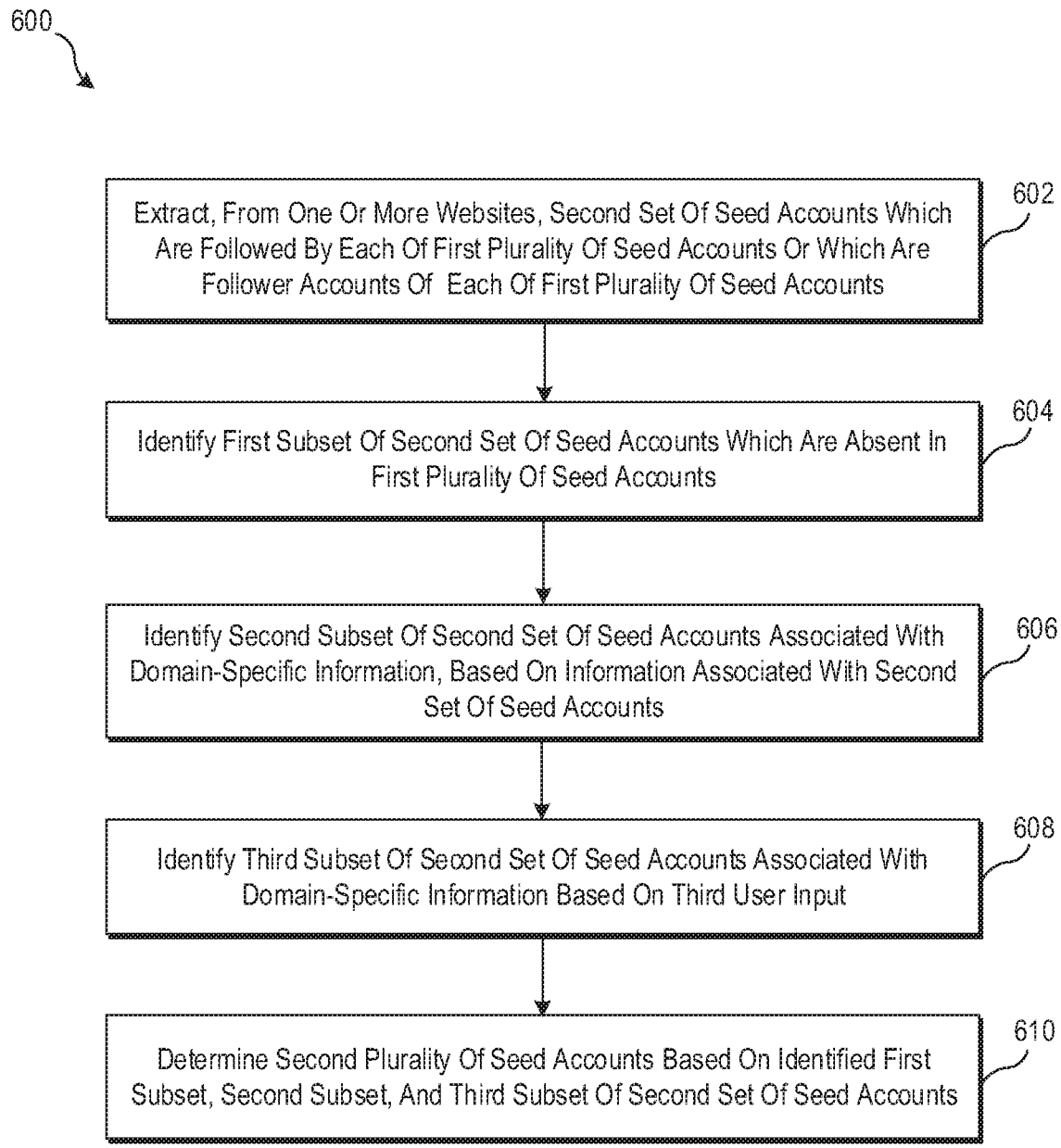
FIG. 6 illustrates a flowchart of an example method for determination of a second plurality of seed accounts for training the GNN.

Although the flowchart 500 is illustrated as discrete operations, such as 502, and 504. However, in certain embodiments, such discrete operations and/or embodiments may be further divided into additional operations, combined into fewer operations, or eliminated, depending on the particular implementation without detracting from the essence of the disclosed embodiments.

FIG. 6 illustrates a flowchart of an example method for determination a second plurality of seed accounts for training a GNN, arranged in accordance with at least one embodiment described in the present disclosure. FIG. 6 is explained in conjunction with elements from FIG. 1, FIG. 2, FIG. 3A, FIG. 3B, FIG. 4, and FIG. 5. With reference to FIG. 6, there is shown a flowchart 600. The method illustrated in the flowchart 600 may start at 602 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 600 may be divided into additional blocks, combined into fewer blocks, or eliminated, depending on the particular implementation.

At block 602, a second set of seed accounts which are followed by each of the first plurality of seed accounts or which are follower accounts of each of the first plurality of seed accounts may be extracted. In an embodiment, the processor 204 may be configured to extract, from the one or more websites 114 (such as the first website 300A), the second set of seed accounts which are followed by each of the first plurality of seed accounts or which are follower accounts of each of the first plurality of seed accounts. The second set of seed accounts may correspond to neighbor seed accounts of the first plurality of seed accounts. In an embodiment, the second set of seed accounts may correspond to social connections or friends of the first plurality of seed accounts, that may be retrieved from connection network associated with the social media website, such as the first website 300A. In an example, the first plurality of seed accounts may correspond to seed accounts associated with the social media networks (such as, but not limited to, Twitter® or Weibo.com®), the processor 204 may be configured to extract, from the social media networks, every seed accounts which are followed by each of the first plurality of seed accounts or which are follower accounts of each of the first plurality of seed accounts. In other words, the processor 204 may be configured to extract, from the social media networks, every seed account which is associated (such as, having connection or relationship) with each of the first plurality of seed accounts. Such extracted seed accounts may be referred as the second set of seed accounts.

At block 604, a first subset of the second set of seed accounts may be identified. In an embodiment, the processor 204 may be configured to identify the first subset of the second set of seed accounts which are absent in the first plurality of seed accounts. The first subset may be additional accounts in the second set of seed accounts, which may not be present in the first plurality of seed accounts retrieved at 502-504 in FIG. 5. The first subset of the second set of seed accounts may include seed accounts which are followed by each of the first plurality of seed accounts or which are follower accounts of each of the first plurality of seed accounts, and are absent in the first plurality of seed accounts. In an embodiment, the processor 204 may be configured to compare each of the second set of seed accounts with the first plurality of seed accounts, to identify the first subset of the second set of seed accounts. The first subset may be identified to avoid duplicate seed accounts between the second set of seed accounts and the first plurality of seed accounts. In some embodiments, the first subset of the second set of seed accounts may be referred as a candidate set of seed accounts which may be potential additional accounts for seed expansion. In an embodiment, the second plurality of seed accounts (i.e. determined at 404 in FIG. 4) may be the first subset of the second set of seed accounts. The processor 204 may be configured to store the identified first subset of the second set of seed accounts in the memory 206 or the persistent data storage 208 as locally stored seed accounts.

At block 606, a second subset of the second set of seed accounts associated with the domain-specific information may be identified. In an embodiment, the processor 204 may be configured to identify the second subset of the second set of seed accounts based on information associated with the second set of seed accounts. The second subset may be associated with the domain-specific information. The second subset of the second set of seed accounts may include seed accounts which are followed by each of the first plurality of seed accounts or which are follower accounts of each of the first plurality of seed accounts, and in addition may be also associated with the domain-specific information (i.e. of the particular domain of interest mentioned in the first user input). In an embodiment, the processor 204 may be configured to compare information associated with each of the second set of seed accounts (i.e. follower accounts or followed by accounts) with the domain-specific information, to identify the second subset of the second set of seed accounts. In other words, the second subset may correspond to those seed accounts (in the second set of seed accounts) which may include the information (like profile description) similar to the domain-specific information (for example "machine learning"). In some embodiments, the first subset of the second set of seed accounts (i.e. identified at 604) may include the second subset, and the second subset may be considered as "positive seed account" in the domain of interest. In an embodiment, the second plurality of seed accounts (i.e. determined at 404 in FIG. 4) may be the second subset of the second set of seed accounts. The processor 204 may be configured to store the identified second subset of the second set of seed accounts in the memory 206 or the persistent data storage 208 as locally stored seed accounts.

In an embodiment, the information associated with the second set of seed accounts may include to at least one of: a profile description associated with the each of the second set of seed accounts, content published by the second set of seed accounts, or a domain-specificity analysis of each of the second set of seed accounts. The profile description associated with the each of the second set of seed accounts may include, but is not limited to a name, a designation, membership information, an area of expertise (such as, a particular domain of interest), work experience information, or a location with the each of the second set of seed accounts. The processor 204 may compare the profile description of each of the second set of seed accounts with the domain-specific information to identify the second subset of seed accounts which are in the domain of interested (i.e. mentioned in the first user input). In an embodiment, the content published by the second set of seed accounts of the social network may include, but not limited to, research papers, conference papers, presentation, and social media postings published by the second set of seed accounts. In an embodiment, the processor 204 may be configured to apply natural language processing on the profile description associated with each of the second set of seed accounts and on the content published by the second set of seed accounts, to determine keywords associated with the domain-specific information. Based on the match between the keywords (for example "machine learning") and the domain-specific information, the processor 204 may identify the second subset of the seed accounts which may be relevant or positive seed accounts in the second set of seed accounts (i.e. neighbor or candidates of the first plurality of seed accounts (i.e. retrieved based on the second user input in FIG. 5).

The domain-specificity analysis of each of the second set of seed accounts may correspond to a relevancy of an association of the seed account with the domain-specific information. The domain-specificity analysis (or a domain-specificity score) may identify which seed account in the second set of seed accounts is a domain-specific seed account (including domain-specific information) or a non-domain specific seed account, as described, for example, in FIGS. 7A and 7B. The processor 204 may be configured to identify the second subset (i.e. positive examples of the seed accounts in the domain of interest) based on execution of the domain-specificity analysis on each of the second set of seed accounts. Thus, the disclosed system may automatically identify the additional seed accounts (like the second set of seed accounts) which may be neighbor accounts or in network connection with the first plurality of seed accounts, and may further perform assessment of the information (i.e. profile information, content published, or domain specificity analysis/score) of the second set of seed accounts to determine the second subset which may be the positive seed examples/candidates in the domain of interest. In an embodiment, remaining accounts in the second set of seed accounts, which may not be in the domain of interest, may be considered as negative seed examples/candidate accounts identified based on the automatic assessment of the information (i.e. profile information, content published, or domain specificity analysis/score) of the second set of seed accounts.

In an embodiment, the first subset of the second set of seed accounts (i.e. identified at 604) may include additional accounts (which are followed by or followed accounts), and the second subset may include accounts which are not only additional accounts, but also include positive or relevant seed accounts in the domain of interest as indicated by the domain-specific information. Therefore, the disclosed system may provide more effective and efficient seed expansion, i.e. discovery of additional accounts of social network based on the analysis of the social network connections as well as the profile information.

In some embodiments, the processor 204 may be configured to obtain a plurality of seed accounts (such as, the first plurality of seed accounts) from a seed set. The processor may be further configured to identify a plurality of candidate accounts (such as, the second set of seed accounts which are followed by each of the first plurality of seed accounts or which are follower accounts of each of the first plurality of seed accounts) based on the plurality of seed accounts. The processor 204 may be configured to identify a subset of candidate accounts (such as, the first subset of the second set of seed accounts) of the plurality of candidate accounts. The processor 204 may be further configured to cluster each candidate account of the subset of candidate accounts into either a non-domain specific cluster (such as, the non-domain specific seed account) and a domain-specific cluster (such as, the domain-specific seed account) based on a plurality of account statistics (such as, the connection information). The processor 204 may be further configured to update at least one of the plurality of candidate accounts and the plurality of seed accounts based on at least one of the non-domain-specific cluster and the domain-specific cluster.

For example, FLA17-008, U.S. patent application Ser. No. 15/710,660 filed on Sep. 20, 2017, which is incorporated by reference herein in its entirety, discusses identification of domain-specific seed accounts in detail. It may be noted that methods to identify domain-specific seed accounts by the referenced application are merely an example. Although, there may be different other ways to identify domain-specific accounts, without departure from the scope of the disclosure At block 608, a third subset of the second set of seed accounts may be identified. In an embodiment, the processor 204 may be configured to identify the third subset of the second set of seed accounts based on a third user input. The third subset may be associated with the domain-specific information. The third user input may be indicative of the third subset of the second set of seed accounts associated with the domain specific information. The processor 204 may be configured to receive the third user input via the I/O device 210 of the electronic device 102. In an embodiment, the processor 204 may be configured to control the display screen 212 to display the second set of seed accounts (i.e. extracted at 602) and receive the third user input from the user 116 to further select the third subset from the second set of seed accounts. In an embodiment, the processor 204 may identify a number of seed accounts in the second set of seed accounts as negative or irrelevant accounts in the domain of interest. Further, the second set of seed accounts may correspond to the positive or relevant accounts in the domain of interest but may have some hidden or unlabeled information in the profile description. Therefore, based on the third user input, human intervention may be required to select and identify positive seed accounts from such negative/irrelevant accounts or hidden/unlabeled or uncertain accounts. Such selected positive seed accounts may correspond to the third subset of the second set of seed accounts At block 610, the second plurality of seed accounts may be determined. In an embodiment, the processor 204 may be configured to determine the second plurality of seed accounts (i.e. also referred in 404 in FIG. 4) based on the identified first subset of the second set of seed accounts. In another embodiment, the processor 204 may be configured to determine the second plurality of seed accounts based on the identified the second subset and the third subset of the second set of seed accounts. The second plurality of seed accounts may correspond to the domain-specific seed accounts. Further, the second plurality of seed accounts may be the additional accounts (other than the first plurality of seed accounts) which may be identified as per process described at 604, 606, and 608 in FIG. 6. The processor 204 may be configured to store the determined second plurality of seed accounts in the memory 206 or the persistent data storage 208 as the locally stored seed accounts. The second plurality of seed accounts may be determined for the training of the GNN 112. Therefore, the second plurality of seed accounts may correspond to the training set of the GNN 112. More specifically, the second plurality of seed accounts may correspond to positive examples of the domain-specific seed accounts, for training the GNN 112 or to expand the training set of the GNN 112. Thus, the disclosed system may automatically identify the additional seed accounts (like the second plurality of seed accounts) based on the first subset, the second subset, and the third subset of the second set of seed accounts, and dynamically train the GNN 112 over time. The disclosed system may automatically update the second plurality of seed accounts over time to dynamically update the training set of the GNN 112 and further enhance accuracy of the GNN 112 over the time. Control may pass to end.

Although the flowchart 600 is illustrated as discrete operations, such as 602, 604, 606, 608, and 610. However, in certain embodiments, such discrete operations may be further divided into additional operations, combined into fewer operations, or eliminated, depending on the particular implementation without detracting from the essence of the disclosed embodiments.

Figure 7A:
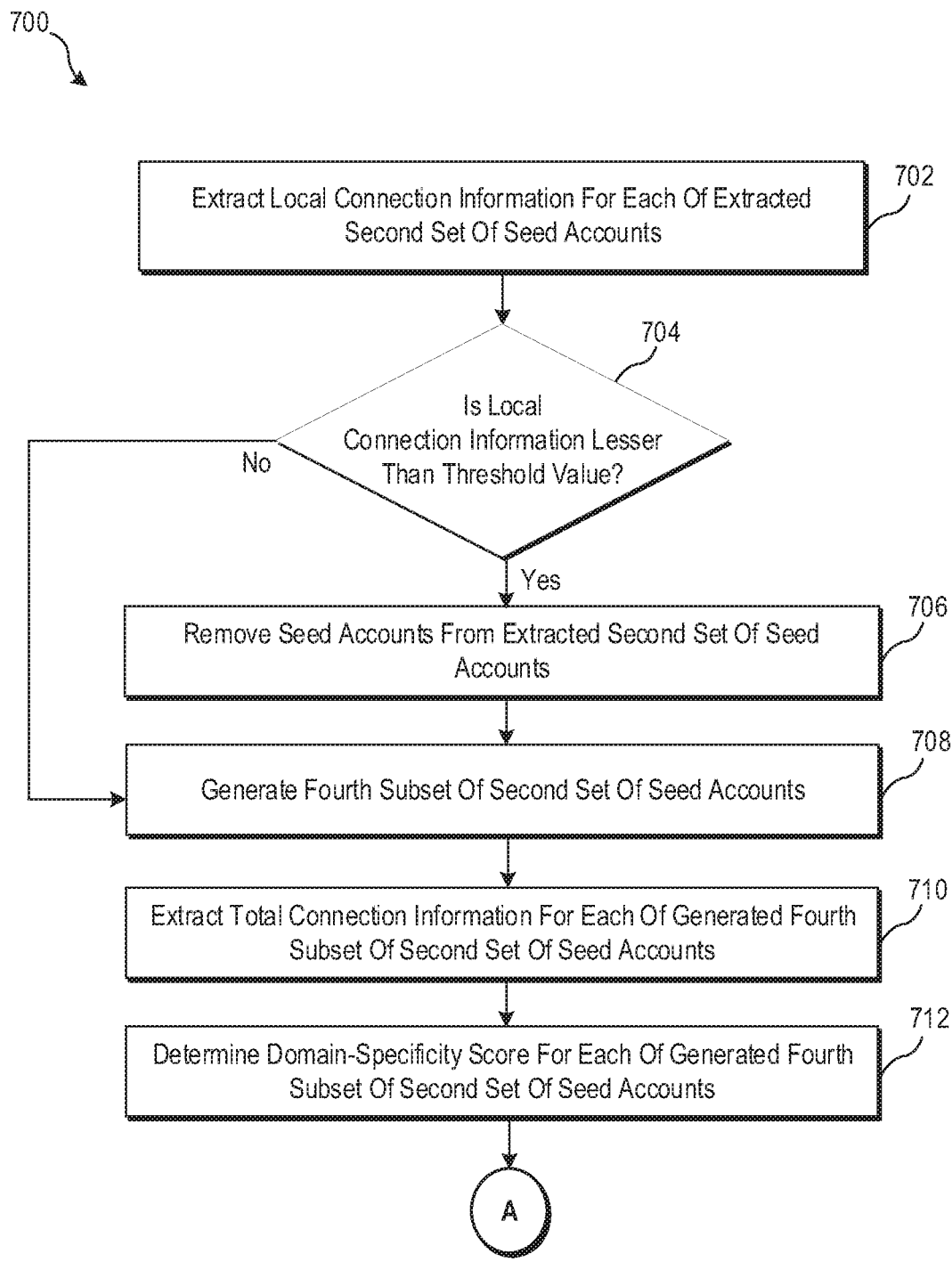
FIGS. 7A, and 7B, collectively illustrate a flowchart of an example method for identification of a second subset of a second set of seed accounts based on the domain-specificity analysis of each of the second set of seed accounts of the first plurality of seed accounts.
Figure 7B:
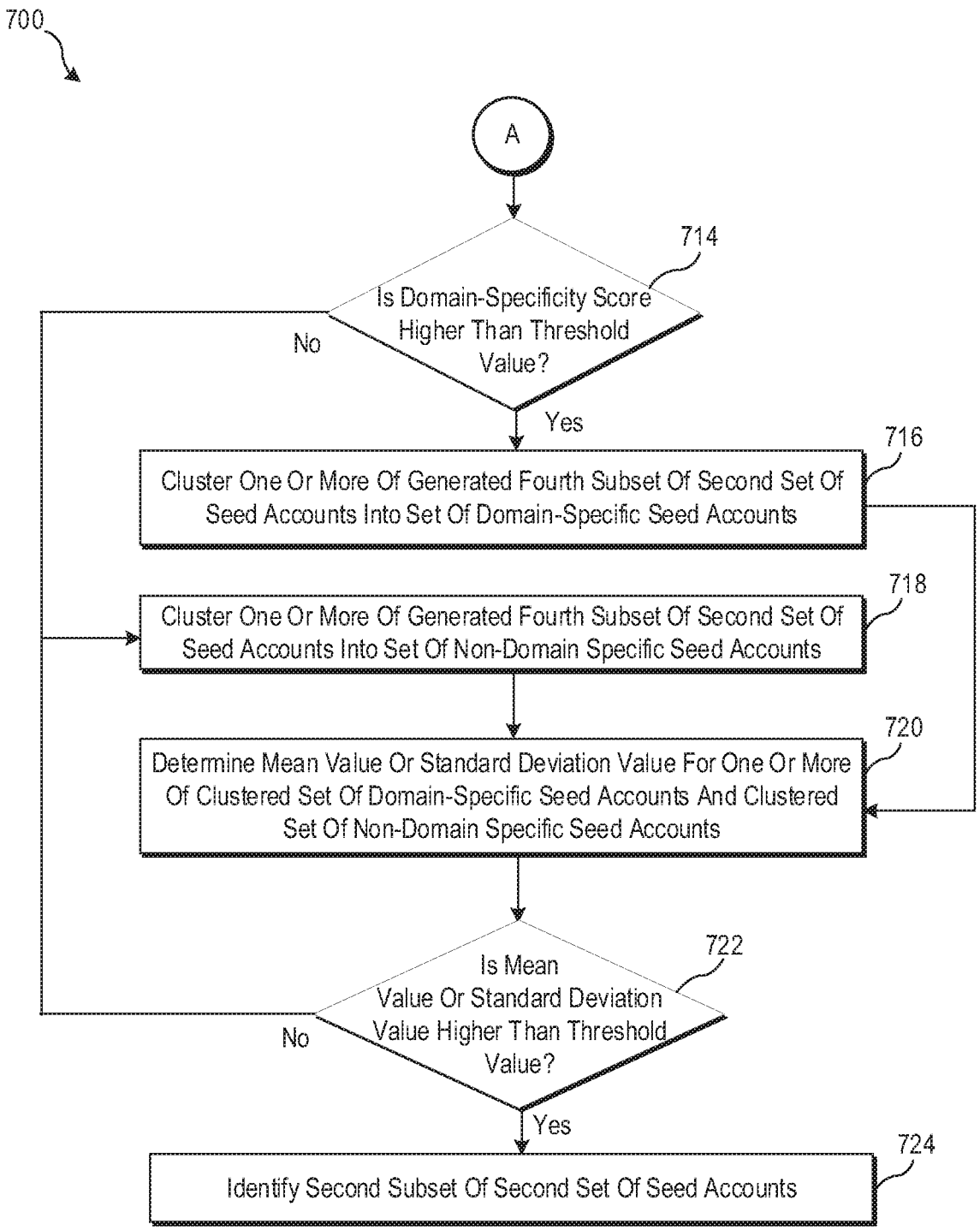

FIGS. 7A, and 7B, collectively illustrate a flowchart of an example method for identification of a second subset of a second set of seed accounts based on the domain-specificity analysis of each of the second set of seed accounts of the first plurality of seed accounts, arranged in accordance with at least one embodiment described in the present disclosure. FIG. 7 is explained in conjunction with elements from FIG. 1, FIG. 2, FIG. 3A, FIG. 3B, FIG. 4, FIG. 5 and FIG. 6. With reference to FIG. 7, there is shown a flowchart 700. The method illustrated in the flowchart 700 may start at 702 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 700 may be divided into additional blocks, combined into fewer blocks, or eliminated, depending on the particular implementation.

At block 702, local connection information for each of the extracted second set of seed accounts may be extracted. In an embodiment, the processor 204 may be configured to extract the local connection information for each of the extracted second set of seed accounts (i.e. extracted from the one or more websites 114 in 602 in FIG. 6). The local connection information may correspond to a number of local connections for each of the extracted second set of seed accounts (i.e. accounts followed by the first plurality of seed accounts or follower accounts of the first plurality of seed accounts). In an embodiment, the extracted local connection information for each of the extracted second set of seed accounts may include a number indegree seed accounts which are follower accounts of each of the extracted second set of seed accounts, and may further include a number of outdegree seed accounts which are followed by each of the extracted second set of seed accounts. In other words, the local connection information may include a number of seed accounts which are following a particular seed account of the second set of seed accounts and a number of seed accounts which are followed by the particular seed account of the second set of seed accounts.

At block 704, it may be determined whether the local connection information is lesser than a threshold value. In an embodiment, the processor 204 may be configured to determine whether the local connection information (i.e. a numerical value) is lesser than the threshold value. The threshold value may correspond to a predefined numeric value such as, 3, 4, 5, or any other smaller numeric value. In an embodiment, the processor 204 may be configured to receive a user input, via the I/O device 210 from the user 116, to set the threshold value. In another embodiment, the processor 204 may be configured to set a default threshold value. The extracted second set of seed accounts having the local information higher than the threshold value may correspond to the domain-specific seed accounts or accounts in the domain of interest. In an example, a particular seed account may have a large number of local connections (e.g. other domain experts/friends as the local connections). On the contrary, the extracted second set of seed accounts having the local information equal or lesser than the threshold value may correspond to the non-domain specific seed account. In an example, there may a particular seed account in the local connection which may not have expertise in the domain of interest. Such seed account may correspond to possible noisy seed accounts (like just a personal friend account who may not in the domain of interest). The processor 204 may set a minimum or smaller threshold value of the local connection information, to eliminate such noisy seed accounts (i.e. negative examples). In case, the determined local connection information is lesser than the threshold value for a particular seed account, the processor 204 may be configured to remove that particular seed account from the extracted second set of seed accounts. Therefore, a number of seed accounts in the second set of seed accounts having the corresponding local connection information lower than the threshold value may be removed or discarded from the second set of seed accounts. In such case, control may pass to 706. Otherwise control may pass to 708.

At block 706, a number of seed accounts from the extracted second set of seed accounts may be removed. In an embodiment, the processor 204 may be configured to remove the number of seed accounts from the extracted second set of seed accounts having the local connection information lesser than the threshold value, to generate a fourth subset of the second set of seed accounts. The fourth subset of the second set of seed accounts may be the remaining seed accounts of the second set of seed accounts after removal of the number of seed accounts.

At block 708, the fourth subset of the second set of seed accounts may be generated. In an embodiment, the processor 204 may be configured to generate the fourth subset of the second set of seed accounts based on the local connection information. The fourth subset may include those seed account from the second set of seed accounts which may have the local location information (i.e. the number indegree seed accounts and/or the number of outdegree seed accounts) higher than the threshold value.

At block 710, total connection information for each of the generated fourth subset of the second set of seed accounts may be extracted. In an embodiment, the processor 204 may be configured to extract the total connection information for each of the generated fourth subset of the second set of seed accounts. The total connection information may correspond to a number of total connections (e.g. in whole social network connections) for each of the generated fourth subset of the second set of seed accounts. In an embodiment, the extracted total connection information for each of the generated fourth subset of the second set of seed accounts may include a total number indegree seed accounts, and a total number of outdegree seed accounts in the whole social network connections. In other words, the total connection information may include a total number of seed accounts the in whole social network connections which are followed by the fourth subset of the second set of seed accounts and a total number of seed accounts in the whole social network connections which are followers of the fourth subset of the second set of seed accounts.

At block 712, a domain-specificity score for each of the generated fourth subset of the second set of seed accounts may be determined. In an embodiment, the processor 204 may be configured to determine the domain-specificity score for each of the generated fourth subset of the second set of seed accounts based on the extracted local connection information and the extracted total connection information. The domain-specificity score may correspond to a ratio of the local connection information and the total connection information of the generated fourth subset of the second set of seed accounts. Examples of the local connection information and the total connection information of the generated fourth subset of the second set of seed accounts are provided in Table 1, as follows:

TABLE 1

Examples of the local connection information and the total connection

| Seed Account | Local connection Information | Total connection information | Domain-specificity score |
|---|---|---|---|
| NameA | 1918 | 87.7 Millions | $2.19 \times 10^{-5}$ |
| NameB | 1077 | 12100 | $8.94 \times 10^{-2}$ |
| NameC | 369 | 48.5 Millions | $7.61 \times 10^{-6}$ |

Table 1: Examples of the local connection information and the total connection information It should be notes that the data in Table 1 is merely provided as experimental data and should not be construed as limiting for the present disclosure. As shown in the Table 1, a seed account (such as, "NameA") which may be a celebrity in the domain of interest and may have a high number total connections (such as, 87.7 Millions), whereas another seed account (such as, "NameB") which may be an expert in the domain of interest and may have low number of total connections (such as, "12100"). Therefore, the domain expert may still have higher ratio (or the domain-specificity score) than the celebrity (i.e. who may still have some knowledge in the domain of interest and also have higher local connections than the domain expert). In an embodiment, the processor 204 may set a threshold value for the domain-specificity score to filter or discard the seed accounts having the domain-specificity score lower than the set threshold value from the generated fourth subset of the second set of seed accounts. Referring to 606 in FIG. 6, the seed account having the domain-specificity score higher than the set threshold value may be included in the second subset of the second set seed account.

At block 714, it may be determined whether the domain-specificity score is higher than a threshold value. In an embodiment, the processor 204 may be configured to determine whether the domain-specificity score (i.e. determined for each of the fourth subset of the second set of seed accounts) is higher than the threshold value. The threshold value may correspond to a predefined numeric ratio value. In an embodiment, the processor 204 may be configured to receive a user input (via the I/O device 210) to set the threshold value. In another embodiment, the processor 204 may be configured to set a default threshold value for the domain-specificity score. The particular account in the generated fourth subset having the domain-specificity score higher than the threshold value may correspond to the domain-specific seed accounts (for example, the seed account "NameB" of the domain expert of Table 1). On the contrary, the particular account in the generated fourth subset having the domain-specificity score equal or lesser than the threshold value may correspond to the non-domain specific seed account (for example, the seed account "NameA" of the celebrity of Table 1). Such seed accounts may correspond to possible noisy seed accounts. In case, the determined domain-specificity score is higher than the threshold value, the processor 204 may be configured to cluster the corresponding seed account of the generated fourth subset of the second set of seed accounts into a set of domain-specific seed accounts. In such a case, control may pass to 716. Otherwise control may pass to 718.

At block 716, one or more seed accounts the generated fourth subset of the second set of seed accounts may be clustered into the set of domain-specific seed accounts. In an embodiment, the processor 204 may be configured to cluster the one or more seed accounts of the generated fourth subset into the set of domain-specific seed accounts, where the one or more seed account may have the domain-specificity score higher than the threshold value (i.e. predefined numeric ratio value). The set of domain-specific seed accounts may be the social/seed accounts which may be in the domain of interest for the user 116 as per the domain-specific information. Control may pass to 720.

At block 718, one or more of the generated fourth subset of the second set of seed accounts may be clustered into a set of non-domain specific seed accounts. In an embodiment, the processor 204 may be configured to cluster the one or more of the generated fourth subset into the set of non-domain specific seed accounts, where the one or more seed accounts may have the domain-specificity score equal or lower than the threshold value (i.e. predefined numeric ratio value).

At block 720, one of a mean value or a standard deviation value may be determined. In an embodiment, the processor 204 may be configured to determine one of the mean value or the standard deviation value for each of the clustered set of domain-specific seed accounts and each of the clustered set of non-domain specific seed accounts. In an embodiment, the processor 204 may be configured to determine an average mean value or an average standard deviation value for all the clustered set of domain-specific seed accounts. The processor 204 may be further configured to compare the mean value or the standard deviation value for each of the clustered set of non-domain specific seed accounts with the average mean value or the average standard deviation value of the clustered set of domain-specific seed accounts. Based on the comparison, the processor 204 may be configured to identify a particular non-domain specific seed account from the clustered set of non-domain specific seed accounts, as the domain specific seed account. For example, in case the mean/standard deviation value of the particular non-domain specific seed account is higher than the average mean/standard deviation value of all the clustered set of domain-specific seed accounts, the processor 204 may further classify or cluster the particular non-domain specific seed account from the clustered set of non-domain specific seed accounts into the clustered set of domain-specific seed accounts (i.e. moving non-domain seed account from the non-domain specific cluster to the domain specific cluster).

At block 722, it may be determined whether the mean value or the standard deviation value is higher than a threshold value. In an embodiment, the processor 204 may be configured to determine whether the mean value or the standard deviation value is higher than the threshold value. The threshold value may correspond to a predefined numeric value. In an embodiment, the processor 204 may be configured to receive a user input (via the I/O device 210) to set the threshold value. In another embodiment, the processor 204 may be configured to set a default threshold value. The seed accounts having the mean value or the standard deviation value higher than the threshold value may correspond to the domain-specific seed accounts. Such seed accounts may correspond to positive seed account examples in the domain of interest (for example "machine learning" as indicated in the first user input). On the contrary, the seed accounts having the mean value or the standard deviation value equal or lesser than the threshold value may correspond to the non-domain specific seed account. Such seed accounts may correspond to possible noisy seed accounts (negative account examples). In case, the determined mean value or the determined standard deviation value is higher than the threshold value, the processor 204 may be configured to identify the second subset of the second set of seed accounts (for example, at 606 in FIG. 6). In such case, control may pass to 724. In case, the determined mean value or the determined standard deviation value is lower than the threshold value, the processor 204 may be configured to identify the seed account as the non-domain specific seed account. Therefore, the seed account may be clustered into the set of non-domain specific seed accounts (for example, at 718 in FIG. 7B).

At block 724, the second subset of the second set of seed accounts may be identified. In an embodiment, the processor 204 may be configured to identify the second subset of the second set of seed accounts based on the clustered set of domain-specific seed accounts and the clustered set of non-domain specific seed accounts. The processor 204 may be configured to identify the second subset of the second set of seed accounts based on the clustered set of domain-specific seed accounts which have the determined mean value or the standard deviation value higher than a first threshold value, and the clustered set of non-domain specific seed accounts which have the determined mean value or the standard deviation value lower than a second threshold value. Therefore, the determination of the domain-specificity score may correspond to the domain-specificity analysis for the identification of the second subset of the second set of seed accounts as described, for example, at 606 in FIG. 6. Control may pass to end.

Although the flowchart 700 is illustrated as discrete operations, such as 702, 704, 706, 708, 710, 712, 714, 716, 718, 720, 722, and 724. However, in certain embodiments, such discrete operations may be further divided into additional operations, combined into fewer operations, or eliminated, depending on the particular implementation without detracting from the essence of the disclosed embodiments.

FIGS. 8A, and 8B, collectively illustrate a flowchart of an example method for generation of a final set of seed accounts associated with the domain-specific information, arranged in accordance with at least one embodiment described in the present disclosure. FIGS. 8A, and 8B is explained in conjunction with elements from FIG. 1, FIG. 2, FIG. 3A, FIG. 3B, FIG. 4, FIG. 5, FIG. 6, FIG. 7A, and FIG. 7B. With reference to FIGS. 8A, and 8B, there is shown a flowchart 800. The method illustrated in the flowchart 800 may start at 802 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 800 may be divided into additional blocks, combined into fewer blocks, or eliminated, depending on the particular implementation.

At block 802, the first plurality of seed accounts and the second plurality of seed accounts (related to first plurality of seed accounts) may be extracted based on domain-specific information. In an embodiment, the processor may be configured to extract, from the one or more websites 114, the first plurality of seed accounts and the second plurality of seed accounts (i.e. related to or associated with the first plurality of seed accounts) based on the domain-specific information. The extraction (or retrieval) of the first plurality of seed accounts and the extraction (or determination) of the second set of seed accounts are described, for example, in FIGS. 5, and 6. The first plurality of seed accounts (i.e. initial seed set) and the second plurality of seed accounts (i.e. additional seed accounts as positive seed accounts in the domain of interest) may be extracted for training the GNN 112. The first plurality of seed accounts and the second plurality of seed accounts may be considered as graphical data (e.g. graph 112A in FIG. 1) by the GNN 112. Such graphical data (or input graphical data for GNN 112) may include a plurality of nodes (such as, seed accounts) and a plurality of edges indicative of an association, connection, or relationship present between the plurality of nodes (or seed accounts). Based on the plurality of edges, the GNN 112 may identify, for a particular seed account, which seed account is a follower of the particular seed account and which seed account is followed by the particular seed account. For training the GNN 112, information for each node (such as, the seed account) of the input graphical data may be encoded to generate a vector, to classify each of a labeled and/or unlabeled information associated with each node. The information for each of node (such as the seed account) may correspond to a set of features including, but are not limited to, a profile description of the seed account, content publications associated with the seed account, connection information. Further, the information may include the labeled and/or the unlabeled information associated with each node. Herein, the labeled information associated with the node may include, but is not limited to, the profile information, or connection information, that may directly classify the domain-specific information associated with the seed account, whereas the unlabeled information associated with the node may include, but is not limited to, content information, that may classify the domain-specific information associated with the seed account indirectly. Further, the processor 204 may analyze the unlabeled information using one or more processing techniques, to classify the domain-specific information. The processor 204 may be configured to identify the seed accounts associated with the domain-specific information based on the classification. Therefore, the GNN 112 may be trained to classify each of the first plurality of seed accounts and the second plurality of seed accounts as the domain-specific or non-domain specific seed accounts.

At block 804, one or more features of each of the first plurality of seed accounts and each of the second plurality of seed accounts may be encoded to generate a first vector. In an embodiment, the processor 204 may be configured to encode the one or more features of each of the retrieved (or extracted) first plurality of seed accounts and each of the determined (or extracted) second plurality of seed accounts to generate the first vector. The processor 204 may be configured to encode the one or more features to generate a feature vector (i.e. first vector) for the training of the GNN 112. The one or more features of the seed accounts (or nodes) may include, but is not limited to a profile description, connection information (e.g. the local connection information), or a profile uniform resources location (URL). In an embodiment, the processor 204 may encode the one or more features based on at least one of a pre-trained contextual embedding (or a pre-trained bag of embedding) for the profile description, a numeric encoding for the connection information, or a pre-trained encoding for the profile URL. In an embodiment, the processor 204 may encode a profile description (textual information) into a vector to shorten length of the profile description to a compressed length, such that vectors of two corresponding profile descriptions of the same lengths and types may be compared, to further compare the corresponding profile descriptions.

In an embodiment, the processor 204 may encode the profile description (i.e. textual information) of each of the retrieved first plurality of seed accounts and each of the determined second plurality of seed accounts into a vector (such as the first vector) based on a short text pre-trained contextual embedding, such as, but not limited to, Bidirectional Encoder Representations from Transformers (BERT). In another embodiment, the processor 204 may encode the profile description into a vector (such as the first vector) based on a long text pre-trained bag of embedding, such as, but not limited to, word2vec or fasttext. In an example, the processor 204 may encode the name associated with the profile description into a vector (such as the first vector) based on a categorical encoding. Further, the processor 204 may encode the connection information (i.e. the number of indegree seed accounts and/or the number of outdegree seed accounts) into a vector (such as the first vector) based on a numeric encoding. For example, the processor 204 may represent the local connection information as a number that may represent a number of local connections of the seed account. Further, the processor 204 may encode the profile URL (i.e. textual information) of each of the retrieved first plurality of seed accounts and each of the determined second plurality of seed accounts into a vector (such as the first vector) based on the short text pre-trained contextual embedding. In an embodiment, the GNN 112 may be trained based on the encoded one or more features of each of the retrieved first plurality of seed accounts and each of the determined second plurality of seed accounts (as the input graphical data). In an embodiment, the processor 204 may be configured to concatenate the one or more features associated with the first vector to generate the concatenated set of features and accordingly train the GNN 112 based on the concatenation. Herein, each of the one or more features may include at least one of a set of textual features, a set of categorical features, or a set of numeric features.

At block 806, a new seed account different from the first plurality of seed accounts and the second plurality of seed accounts may be selected. In an embodiment, the processor 204 may be configured to select the new seed account that may be different from the first plurality of seed accounts (i.e. initial seed account retrieved in FIG. 5) and the second plurality of seed accounts (i.e. additional seed accounts determined in FIG. 6). The new seed account may a social account which may recently added in connection with one of the first plurality of seed accounts and the second set of seed accounts. In an embodiment, the new seed account may be unknown seed account (or node) to the trained GNN 112. The trained GNN 112 may be applied to the new seed account for the classification into the domain specific seed accounts or the non-domain specific seed accounts, and accordingly update the training set of the GNN 112 based on the classification. Thus, the update of the training set of the GNN 112 may correspond to the seed expansion (i.e. update of the training set with the new seed account).

At block 808, a plurality of neighbor seed accounts may be extracted, from the one or more website 114, for the selected new seed account. In an embodiment, the processor 204 may be configured to extract, from the one or more websites 114, the plurality of neighbor seed accounts for the selected new seed account. The plurality of neighbor seed accounts may include a set of seed accounts which are followed by the new seed account and a set of seed accounts which are followers of the new seed accounts.

At block 810, a second vector may be generated for the selected new seed account based on the extracted plurality of neighbor seed accounts using the trained GNN 112 (i.e. trained with the first plurality of seed accounts and the second set of seed accounts). In an embodiment, the processor 204 may be configured to generate the second vector for the selected new seed account based on the extracted plurality of neighbor seed accounts using the trained GNN 112. The processor 204 may be configured to encode one or more features of the selected new seed account to generate the second vector using the GNN 112. Based on the encoding, information (such as, a message) associated with the one or more features may be passed between the selected node (such as, the selected new seed account) and the neighboring nodes (such as, related seed accounts) connected through the corresponding edges (of the input graphical data). The processor 204 may generate the second vector for the selected new seed account based on the message passing (i.e. associated with the one or more features) between the new seed account and the neighboring nodes. The GNN 112 may be trained to predict or classify the selected new seed account as the domain-specific seed account or the non-domain specific seed account based on the generated first vector and the second vector.

At block 812, the selected new seed account may be determined as the domain-specific seed account or as the non-domain specific seed account. In an embodiment, the processor 204 may be configured to determine the selected new seed account as the domain-specific seed account or as the non-domain specific seed account based on the generated first vector and the generated second vector. The processor 204 may be configured to analyze the generated first vector and the generated second vector, to determine the selected new seed account as the domain-specific seed account or as the non-domain specific seed account. The processor 204 may be configured to classify the selected new seed account as the domain-specific seed account or the non-domain-specific seed account using pre-trained binary classifier. The binary classifier may be pre-trained using GNN 112 to classify the selected new seed account as the domain-specific seed account or the non-domain-specific seed account In case, the selected new seed account is classified as the domain-specific seed account, the processor 204 may be configured to add the new seed account into the first plurality of seed accounts, the control may pass to 814A. Otherwise, the selected new seed account may correspond to possible noisy seed account. In such case, the selected new seed account may be determined as the non-domain specific seed account, the control may pass to 814B.

At block 814A, the new seed account determined as the domain-specific seed account may be added into the first plurality of seed accounts. In an embodiment, the processor 204 may be configured to add the new seed account determined as the domain-specific seed account, into the first plurality of seed accounts. Further, addition of the new seed account into the first plurality of seed accounts (or into the second plurality of seed accounts) may correspond to expansion of seed accounts in the training set of the GNN 112 (i.e. to achieve larger graph), such that the accuracy of classification of the GNN 112 may be enhanced with more accurate and reliable training set (i.e. final set of seed accounts). Therefore, over the time, with the more number of new/unknown seed accounts added in the social network and also determined as the domain specific seed account, the training set (or the input graphical data) of the GNN 112 and corresponding classification accuracy may be expanded/updated. Control may pass to 820.

At block 814B, the trained GNN 112 may be applied on the new seed account determined as the non-domain specific seed account, to generate a certainty score. In an embodiment, the processor 204 may be configured to apply the trained GNN 112 on the new seed account determined as the non-domain specific seed account, to generate the certainty score. The certainty score may correspond to a probability or prediction score (i.e. output of the classification of the GNN 112) associated with the determined non-domain specific seed account. The processor 204 may be configured to control the application of the trained GNN 112 on the new seed account (i.e. determined as the non-domain specific seed account or negative seed accounts in the domain of interest at 812 in FIG. 8A) to verify or validate whether the new seed account is actually the non-domain specific seed account or not, based on the generated certainty score of the trained GNN 112. For example, in case, the generated certainty score (for an output class associated non-domain specific seed account) is high (i.e. greater than a threshold prediction value), indicates that the new seed account may be non-domain specific seed account in actual. On the other hand, in case, the generated certainty score (for the output class associated non-domain specific seed account) is low (i.e. lower or equal than the threshold prediction value), indicates that the new seed account may be the domain specific seed account (or positive seed account) as predicted by the trained GNN 112.

At block 816, it may be determined whether the certainty score is higher than a threshold value. In an embodiment, the processor 204 may be configured to determine whether the certainty score (i.e. determined at 814B in FIG. 8A) is higher than the threshold value (e.g. threshold prediction value). The threshold value may correspond to a predefined numeric value (such as, between 0.5 to 1.0. In an embodiment, the processor 204 may be configured to receive a user input (via the I/O device 210) to set the threshold value. In another embodiment, the processor 204 may be configured to set a default threshold value. The new seed accounts (i.e. determined as the non-domain specific seed accounts) having the certainty score higher than the threshold value may correspond to the non-domain-specific seed accounts or negative seed accounts. On the contrary, the new seed accounts (i.e. determined as the non-domain specific seed accounts) having the certainty score equal or lesser than the threshold value may correspond to the domain specific seed account or positive seed accounts. In case, the determined certainty score is lower or equal than the threshold value, the processor 204 may be configured to add the new seed account (verified as the domain-specific seed account) in the first plurality of seed accounts and the second plurality of seed accounts for the seed expansion. In such case, the control passes to 820, otherwise passes to 818.

At block 818, the new seed account may be removed from the non-domain specific seed accounts. In an embodiment, the processor 204 may be configured to remove the new seed account from the non-domain specific seed accounts based on the determination that the certainty score is higher than the threshold value (i.e. threshold prediction value). In an embodiment, when the determined certainty score is higher than the threshold value, the processor 204 may confirm that the new seed account (i.e. determined as the non-domain specific seed account at 812) is actually the non-domain-specific seed account based on the application of the trained GNN 112 and further to be removed for the purpose of the seed expansion of the training set and improved accuracy of the GNN 112. In some other embodiments, the processor 204 may not remove such negative seed accounts (i.e. new seed account), and still updated the current training set of the GNN 112 with such seed accounts based on predefined conditions (such as user input received from the user 116 or an application area of the trained GNN 112 or the disclosed system 202).

At block 820, the first plurality of seed accounts and the second plurality of seed accounts (i.e. training dataset of the GNN 112) may be updated. In an embodiment, the processor 204 may be configured to update the retrieved first plurality of seed accounts and the determined second plurality of seed accounts based on the addition of the new seed account (i.e. verified as the domain-specific seed account in actual based on the generated certainty score at 814B and 816). Therefore, the current training dataset of the GNN 112 may be further updated based on the added new seed account as the seed expansion to further improve the classification accuracy of the trained GNN 112.

At block 822, it may be determined whether a defined number of the updated first plurality of seed accounts and the second plurality of seed accounts are collected. In an embodiment, the processor 204 may be configured to determine whether the defined number of the updated first plurality of seed accounts and the second plurality of seed accounts are collected or not. In an embodiment, the processor 204 may be configured to receive a user input (via the I/O device 210) to set the defined number of the updated first plurality of seed accounts and the second plurality of seed accounts. In another embodiment, the processor 204 may be configured to set a default value of the defined number.

In an embodiment, the processor 204 may be configured to determine a number of the updated first plurality of seed accounts and the second plurality of seed accounts, and further compare the determined number and the predefined number to confirm the collection. The defined number of the updated first plurality of seed accounts and the second plurality of seed accounts may correspond to a ratio of the new seed accounts identified as the domain-specific seed account, and the new seed accounts identified as the non-domain specific seed account. When the ratio is lower than a threshold value (such as 0.5, indicating that number of new seed accounts as the domain-specific seed accounts are less than the non-domain specific seed account), the processor 204 may be configured to generate the final set of seed accounts. In case, the defined number of the updated first plurality of seed accounts and the second plurality of seed accounts are collected, the processor 204 may be configured to generate the final set of seed accounts. In such case, control may pass to 824. Otherwise control may pass to 802 in FIG. 8A to extract more seed accounts from the one or more website or the social networks to achieve a particular level of classification accuracy of the GNN 112.

At block 824, the final set of seed accounts may be generated. In an embodiment, the processor 204 may be configured to generate the final set of seed accounts based on the determination that the defined number of the updated first plurality of seed accounts and the second plurality of seed accounts are collected, as described at 822. The final set of seed accounts may correspond to the collection of the appropriate number of the updated first plurality of seed accounts and the second plurality of seed accounts. In an embodiment, the final set of seed accounts may be associated with the domain-specific information (i.e. indicated in the first user input provided by the user 116 at 402 in FIG. 4). Control may pass to end.

Although the flowchart 800 is illustrated as discrete operations, such as 802, 804, 806, 808, 810, 812, 814A, 814B, 816, 818, 820, 822, and 824. However, in certain embodiments, such discrete operations may be further divided into additional operations, combined into fewer operations, or eliminated, depending on the particular implementation without detracting from the essence of the disclosed embodiments.

FIG. 9 illustrates a flowchart of an example method for generation of a final set of seed accounts associated with the domain-specific information based on an application of a predefined ranking criteria, arranged in accordance with at least one embodiment described in the present disclosure. FIG. 9 is explained in conjunction with elements from FIG. 1, FIG. 2, FIG. 3A, FIG. 3B, FIG. 4, FIG. 5, FIG. 6, FIG. 7A, FIG. 7B., and FIGS. 8A, and 8B. With reference to FIG. 9, there is shown a flowchart 900. The method illustrated in the flowchart 900 may start at 902 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 900 may be divided into additional blocks, combined into fewer blocks, or eliminated, depending on the particular implementation.

At block 902, an importance score may be determined. In an embodiment, the processor 204 may be configured to determine the importance score for each of the updated first plurality of seed accounts and the second plurality of seed accounts based on the local connection information and the total connection information associated with the updated first plurality of seed accounts and the second plurality of seed accounts. The importance score may correspond to a numeric value indicative of significance of the seed account in the domain of interest. In an embodiment, a high numeric value of the importance score may be indicative of the importance of the seed account (i.e., high expertise of the expert) in the domain of interest. The processor 204 may be configured to determine the importance score based on at least one of: profile description of the seed account, content published by the seed account, or connection information of the seed account. In an embodiment, a seed account having the high connection information may have a high importance score. The processor 204 may be configured to control the display screen 212 to display the generated final set of seed accounts based on the increasing or decreasing order of the importance score.

In some embodiments, the processor 204 may be configured to extract author profile data from one or more authors of domain-specific content (such as, the domain-specific information). The author profile data may include, but is not limited to a name of the author, an affiliation of the author, title of the author, co-authors, a document image of the author, and an expertise or interest description of the author (such as, related to "machine learning" indicated by the first user input). The processor 204 may be configured to identify social media content (such as, the profile description, or the content publication) based on the author profile data. The processor 204 may be configured to rank the social media content based on at least one of user interest data (such as the domain of interest), user preference data, statistics for the social media content (such as, the content publication), author data (such as, the profile description), and content age data.

For example, FLA15-067, U.S. patent application Ser. No. 15/236,183 filed on Aug. 12, 2016, which is incorporated by reference herein in its entirety, discusses the ranking of social media content in detail. It may be noted that methods to rank the social media content by the referenced application are merely an example. Although, there may be different other ways to rank the social media accounts, without departure from the scope of the disclosure.

At block 904, a mutually reinforcing ranking may be determined. In an embodiment, the processor 204 may be configured to determine the mutually reinforcing ranking or a mutually reinforcing relationship (MRR) for each the updated first plurality of seed accounts and the second plurality of seed accounts based on a frequency of publishing content by each of the first plurality of seed accounts and the second plurality of seed accounts. In an embodiment, the processor 204 may be configured to analyze the content published by an expert of each of the first plurality of seed accounts and the second plurality of seed accounts on the social media account. Thus, the mutually reinforcing ranking may indicate a relationship between the seed account and the content published by the expert of the seed account. The mutually reinforcing ranking may correspond to a classifying or the ranking criterion of the seed account. For example, in case the expert having the social media account, does not share content related to the domain-specific information, the processor 204 may be configured to determine a low mutually reinforcing ranking for the seed account. On the contrary, when the expert having the social media account frequently shares content related to the domain-specific information, the processor 204 may be configured to determine a high mutually reinforcing ranking for the seed account. In an embodiment, a seed account, having high frequency of sharing or publishing the content relevant to the domain-specific information, may have high mutually reinforcing ranking. In an embodiment, the processor 204 may be configured to control the display screen 212 to display the generated final set of seed accounts based on the increasing or decreasing order of the mutually reinforcing ranking.

In some embodiments, the processor 204 may be configured to determine a general type weight and an individual weight for each social media account of a plurality of social media accounts (such as, the first plurality of seed accounts and the second plurality of seed accounts). Herein, the general type weight may be determined based on a social media account type corresponding to the social media account. The processor 204 may be configured to encode a mutually reinforcing relationship between the social media accounts and contents promoted by each of the social media accounts. The mutually reinforcing relationship may be encoded as a promotional link between the social media accounts and a content item of the contents (such as, the content publication) promoted by each of the social media accounts. The processor 204 may be configured to calculate a basic link strength for each promotional link. The basic link strength may be calculated based on the general type weight and the individual weight for each social media account of the plurality of social media accounts. The processor 204 may be further configured to calculate a mutually reinforcing ranking of the plurality of social media accounts and contents based on the basic link strengths.

For example, FLA16-042, U.S. patent application Ser. No. 15/653,356 filed on Jul. 18, 2017, which is incorporated by reference herein in its entirety, discusses mutually reinforcing ranking of social media accounts in detail. It may be noted that methods for the mutually reinforcing ranking of the social media accounts by the referenced application are merely an example. Although, there may be different other ways for the mutually reinforcing ranking of the social media accounts, without departure from the scope of the disclosure At block 906, the final set of seed accounts may be generated. In an embodiment, the processor 204 may be configured to generate the final set of seed accounts associated with the domain-specific information based on the predefined ranking criteria, as described at 408 in FIG. 4. The processor 204 may be configured to generate the final set of seed accounts associated with the domain-specific information based on the determined importance score and/or the determined mutually reinforcing ranking for each of the updated first plurality of seed accounts and the second plurality of seed accounts. The predefined ranking criteria may correspond to the determined importance score and/or the determined mutually reinforcing ranking. The processor 204 may be configured to apply the predefined ranking criteria on the updated first plurality of seed accounts and the second plurality of seed accounts to generate the final set of seed accounts. For example, the updated first plurality of seed accounts and the second plurality of seed accounts having the high importance score and/or the high mutually reinforcing ranking may be selected in the final set of seed accounts. In an embodiment, the processor 204 may compare the determined importance score and the determined mutually reinforcing ranking of each of the updated first plurality of seed accounts and the second plurality of seed accounts with respective predefined threshold values, to select the corresponding seed account to be selected in the final set of seed accounts. The processor 204 may be configured to control the display screen (such as, the display screen 212 of the electronic device 102) to output the determined final set of seed accounts, as described at block 410. Control may pass to end.

Although the flowchart 900 is illustrated as discrete operations, such as 902, 904, and 906. However, in certain embodiments, such discrete operations may be further divided into additional operations, combined into fewer operations, or eliminated, depending on the particular implementation without detracting from the essence of the disclosed embodiments FIGS. 10A, and 10B, collectively illustrate, exemplary user interface (UI) that may display a final set of seed accounts based on the predefined ranking criteria, arranged in accordance with at least one embodiment described in the present disclosure. FIGS. 10A, and 10B are explained in conjunction with elements from FIG. 1, FIG. 2, FIG. 3A, FIG. 3B, FIG. 4, FIG. 5, FIG. 6, FIG. 7A, FIG. 7B, FIG. 8A, FIG. 8B, and FIG. 9. With reference to FIG. 10A, there is shown a UI 1000A. The UI 1000A may display the generated final set of seed accounts (i.e. associated with the domain-specific information) based on the determined importance score for each of the updated first plurality of seed accounts and the second plurality of seed accounts. The processor 204 may be configured to control the display screen 212 to display UI 1000A (including the generated the final set of seed accounts) based on an increasing or decreasing importance scores as shown in FIG. 10A. For example, as shown in FIG. 10A, the UI 1000A may display the name of the expert associated with the domain of interest (such as, NameA, NameB, and NameC), an account name of the expert (such as, @personA, @person, @personC), an importance score (numerical values in decreasing order), and the connection information (such as the number of indegree seed accounts, the number of outdegree seed accounts, and associated ratio values) of the final set of seed accounts. It may be noted that information shown in the UI 1000A in FIG. 10A is presented merely as an example, without any deviation from the scope of the disclosure. In some embodiments, the processor 204 may be configured to display the domain-specificity score (not shown) in the UI 1000A, as described, at 712 in FIG. 7.

With reference to FIG. 10B, there is shown a UI 1000B. The UI 1000B may display the generated final set of seed accounts associated with the domain-specific information based on the determined mutually reinforcing ranking for each of the updated first plurality of seed accounts and the second plurality of seed accounts. The processor 204 may be configured to control the display screen 212 to display the UI 1000B (including the generated the final set of seed accounts) based on an increasing or decreasing mutually reinforcing rankings as shown in FIG. 10B. For example, as shown in FIG. 10B, the UI 1000B may display, but is not limited to, a picture of the expert associated with the seed account, a name of the expert (such as, NameA, NameB, and NameC), an account name of the expert (such as, @personA, @person, @personC), an mutually reinforcing ranking, total number of publication, and average position (such as, average frequency of publishing content) for the generated the final set of seed accounts associated with the domain-specific information. It may be noted that information shown in the UI 1000B in FIG. 10B is presented merely as an example, without any deviation from the scope of the disclosure.

Typically, user 116 may identify the plurality of seed accounts associated with a domain of interest by manually searching the one or more websites 114 (for example the publication and social networking websites). However, the manual search may be tedious and time-consuming task, where the user 116 may rely on the search results from the one or more websites 114, and further determine the domain-specific seed accounts manually (i.e. to get the experts related to the domain). As may be evident, the manual process of identification of the seed account related to the domain-specific seed account may be time consuming and may not scale well to a batch of a large number of seed accounts on different social networks. Further, many of the seed accounts may be absent from the search results due to missing or unlabeled profile information. In contrast, the disclosed electronic device 102 may automatically generate the final set of seed accounts based on the Graph neural network (GNN 112) and the analysis of different factors such as, but not limited to, the network connections, profile information, content related information, domain-specificity score, certainty score, importance score, and mutually reinforcing ranking, as described, for example, in FIGS. 4, 5, 6, 7A, 7B, 8A, 8B, and 9. The final set of seed accounts may be the additionally discovered seed accounts which may further enhance (or expand) the training dataset and the classification accuracy of the GNN 112. Further, the disclosed electronic device 102 may further provide an UI (in FIG. 10A and FIG. 10B) of the final set of seed accounts associated with the domain-specific information. The automatic extraction, validation, and the UI provided by the disclosed electronic device 102, may further save substantial time for the user 116 to extract the relevant seed accounts associated with different experts in the domain of interest.

Various embodiments of the disclosure may provide one or more non-transitory computer-readable storage media configured to store instructions that, in response to being executed, cause a system (such as the electronic device 102) to perform operations. The operations may include retrieving, from one or more websites, a first plurality of seed accounts based on a first user input. The first user input may indicate domain-specific information associated with the first plurality of seed accounts. The operations may further include determining a second plurality of seed accounts based on the first plurality of seed accounts associated with the domain-specific information. The second plurality of seed accounts may be determined for training a graph neural network (GNN). The operations may further include updating the retrieved first plurality of seed accounts and the determined second plurality of seed accounts based on the trained GNN. The operations may further include generating a final set of seed accounts associated with the domain-specific information, based on an application of a predefined ranking criteria on the updated first plurality of seed accounts and the second plurality of seed accounts. The operations may further include controlling a display screen to output the generated final set of seed accounts.

Various other embodiments of the disclosure may provide one or more non-transitory computer-readable storage media configured to store instructions that, in response to being executed, cause a system (such as the electronic device 102) to perform operations. The operations may include extracting, from one or more websites, a first plurality of seed accounts and a second plurality of seed accounts, related to the first plurality of seed accounts, based on domain-specific information. The first plurality of seed accounts and the second plurality of seed accounts may be extracted for training a graph neural network (GNN). The operations may further include encoding one or more features of each of the first plurality of seed accounts and each of the second plurality of seed accounts to generate a first vector. The one or more features may correspond to at least one of: a profile description, connection information, or a profile URL. The operations may further include selecting a new seed account different from the first plurality of seed accounts and the second plurality of seed accounts. The operations may further include extracting, from the one or more websites, a plurality of neighbor seed accounts for the selected new seed account. The operations may further include generating a second vector for the selected new seed account based on the extracted plurality of neighbor seed accounts using the trained GNN. The operations may further include determining the selected new seed account as a domain-specific seed account or as a non-domain specific seed account based on the generated first vector and the generated second vector. The operations may further include updating the first plurality of seed accounts and the second plurality of seed accounts based on the determined new seed account as the domain-specific seed account or as the non-domain specific seed account.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
retrieving, from one or more websites, a first plurality of seed accounts based on a first user input, wherein the first user input indicates domain-specific information associated with the first plurality of seed accounts;
determining a second plurality of seed accounts based on the first plurality of seed accounts associated with the domain-specific information, wherein the second plurality of seed accounts are determined for training a graph neural network (GNN);
updating the retrieved first plurality of seed accounts and the determined second plurality of seed accounts based on the trained GNN;
generating a final set of seed accounts associated with the domain-specific information, based on an application of a predefined ranking criteria on the updated first plurality of seed accounts and the second plurality of seed accounts; and controlling a display screen to output the generated final set of seed accounts.

2. The method according to claim 1, wherein the one or more websites comprise at least one of: a website associated with a publication, a conference, or journal of the domain-specific information, or a social network website.

3. The method according to claim 1, further comprising:
receiving a second user input indicative of a first set of seed accounts; and
retrieving, from the one or more websites, the first set of seed accounts based on the received second user input, wherein the first plurality of seed accounts include the first set of seed accounts.

4. The method according to claim 1, further comprising:
receiving a second user input, wherein the second user input corresponds to a name of an author related to the domain-specific information; and
retrieving, from the one or more websites, a first set of seed accounts based on the received second user input, wherein the first plurality of seed accounts include the first set of seed accounts.

5. The method according to claim 1, the determination of the second plurality of seed accounts, further comprising:
extracting, from the one or more websites, a second set of seed accounts which are followed by each of the first plurality of seed accounts or which are follower accounts of each of the first plurality of seed accounts;
identifying a first subset of the second set of seed accounts which are absent in the first plurality of seed accounts; and
determining the second plurality of seed accounts based on the extracted second set of seed accounts and the identified first subset of the second set of seed accounts.

6. The method according to claim 5, further comprising:
identifying a second subset of the second set of seed accounts associated with the domain-specific information based on information associated with the second set of seed accounts, wherein the information corresponds to at least one of: a profile description associated with the each of the second set of seed accounts, content published by the second set of seed accounts, or a domain-specificity analysis of each of the second set of seed accounts;
identifying a third subset of the second set of seed accounts associated with the domain-specific information based on a third user input; and
determining the second plurality of seed accounts based on the identified the second subset and the third subset of the second set of seed accounts.

7. The method according to claim 6, the domain-specificity analysis of the second set of seed accounts, further comprising:
extracting local connection information for each of the extracted second set of seed accounts;
removing a number of seed accounts from the extracted second set of seed accounts having the local connection information lesser than a threshold value, to generate a fourth subset of the second set of seed accounts;
extracting total connection information for each of the generated fourth subset of the second set of seed accounts; and
determining a domain-specificity score for each of the generated fourth subset of the second set of seed accounts based on the extracted local connection information and the extracted total connection information.

8. The method according to claim 7, further comprising:
clustering each of the generated fourth subset of the second set of seed accounts based on the determined domain-specificity score, into a set of domain-specific seed accounts and a set of non-domain specific seed accounts; and
identifying the second subset of the second set of seed accounts based on the clustered set of domain-specific seed accounts and the clustered set of non-domain specific seed accounts.

9. The method according to claim 8, further comprising:
determining one of a mean value or a standard deviation value for each of the clustered set of domain-specific seed accounts and the clustered set of non-domain specific seed accounts; and
identifying the second subset of the second set of seed accounts based on:
the clustered set of domain-specific seed accounts which have the determined mean value or the standard deviation value higher than a first threshold value, and
the clustered set of non-domain specific seed accounts which have the determined mean value or the standard deviation value lower than a second threshold value.

10. The method according to claim 7, wherein the extracted local connection information for each of the extracted second set of seed accounts includes a number indegree seed accounts which are follower accounts of each of the extracted second set of seed accounts, and includes a number of outdegree seed accounts which are followed by each of the extracted second set of seed accounts.

11. The method according to claim 1, further comprising:
encoding one or more features of each of the retrieved first plurality of seed accounts and each of the determined second plurality of seed accounts to generate a first vector, wherein the one or more features correspond to at least one of: a profile description, connection information, or a profile URL;
selecting a new seed account different from the retrieved first plurality of seed accounts and the determined the second plurality of seed accounts;
extracting, from the one or more websites, a plurality of neighbor seed accounts for the selected new seed account;
generating a second vector for the selected new seed account based on the extracted plurality of neighbor seed accounts using the trained GNN; and
determining the selected new seed account as a domain-specific seed account or as a non-domain specific seed account based on the generated first vector and the generated second vector.

12. The method according to claim 11, further comprising:
adding the new seed account determined as the domain-specific seed account into the retrieved first plurality of seed accounts;
applying the trained GNN on the new seed account determined as the non-domain specific seed account to generate a certainty score; and
updating the retrieved first plurality of seed accounts and the determined second plurality of seed accounts based on the addition of the new seed account determined as the domain-specific seed account, and the generated certainty score.

13. The method according to claim 1, further comprising:
  determining a number of the updated first plurality of seed accounts and the second plurality of seed accounts; and
  generating the final set of seed accounts based on the determined number.

14. The method according to claim 1, the application of the predefined ranking criteria, further comprising:
  determining an importance score for each of the updated first plurality of seed accounts and the second plurality of seed accounts based on local connection information and total connection information associated with the updated first plurality of seed accounts and the second plurality of seed accounts;
  determining a mutually reinforcing ranking for each the updated first plurality of seed accounts and the second plurality of seed accounts based on a frequency of publishing content by each of the first plurality of seed accounts and the second plurality of seed accounts; and
  generating the final set of seed accounts associated with the domain-specific information based on the determined importance score and the determined mutually reinforcing ranking for each of the updated first plurality of seed accounts and the second plurality of seed accounts.

15. A method, comprising:
  extracting, from one or more websites, a first plurality of seed accounts and a second plurality of seed accounts, related to the first plurality of seed accounts, based on domain-specific information, wherein the first plurality of seed accounts and the second plurality of seed accounts are extracted for training a graph neural network (GNN);
  encoding one or more features of each of the first plurality of seed accounts and each of the second plurality of seed accounts to generate a first vector, wherein the one or more features correspond to at least one of: a profile description, connection information, or a profile URL;
  selecting a new seed account different from the first plurality of seed accounts and the second plurality of seed accounts;
  extracting, from the one or more websites, a plurality of neighbor seed accounts for the selected new seed account;
  generating a second vector for the selected new seed account based on the extracted plurality of neighbor seed accounts using the trained GNN;
  determining the selected new seed account as a domain-specific seed account or as a non-domain specific seed account based on the generated first vector and the generated second vector; and
  updating the first plurality of seed accounts and the second plurality of seed accounts based on the determined new seed account as the domain-specific seed account or as the non-domain specific seed account.

16. The method according to claim 15, further comprising:
  adding the new seed account determined as the domain-specific seed account into the retrieved first plurality of seed accounts;
  applying the trained GNN on the new seed account determined as the non-domain specific seed account to generate a certainty score; and
  updating the first plurality of seed accounts and the second plurality of seed accounts based on the addition of the new seed account determined as the domain-specific seed account and the generated certainty score.

17. The method according to claim 15, further comprising:
  determining a number of the updated first plurality of seed accounts and the second plurality of seed accounts; and
  generating a final set of seed accounts based on the determined number.

18. One or more non-transitory computer-readable storage media configured to store instructions that, in response to being executed, cause a system to perform operations, the operations comprising:
  retrieving, from one or more websites, a first plurality of seed accounts based on a first user input, wherein the first user input indicates domain-specific information associated with the first plurality of seed accounts;
  determining a second plurality of seed accounts based on the first plurality of seed accounts associated with the domain-specific information, wherein the second plurality of seed accounts are determined for training a graph neural network (GNN);
  updating the retrieved first plurality of seed accounts and the determined second plurality of seed accounts based on the trained GNN;
  generating a final set of seed accounts associated with the domain-specific information, based on an application of a predefined ranking criteria on the updated first plurality of seed accounts and the second plurality of seed accounts; and
  controlling a display screen to output the generated final set of seed accounts.

19. The one or more computer-readable storage medium according to claim 18, wherein the one or more websites comprise at least one of: a website associated with a publication, a conference, or journal of the domain-specific information, or a social network website.

20. The one or more computer-readable storage medium according to claim 18, the determination of the second plurality of seed accounts, further comprising:
  extracting a second set of seed accounts which are followed by each of the first plurality of seed accounts or which are follower accounts of each of the first plurality of seed accounts;
  identifying a first subset of the second set of seed accounts which are absent in the first plurality of seed accounts; and
  determining the second plurality of seed accounts based on the extracted second set of seed accounts and the identified first subset of the second set of seed accounts.

21. The one or more computer-readable storage medium according to claim 20, further comprising:
  identifying a second subset of the second set of seed accounts associated with the domain-specific information based on information associated with the second set of seed accounts, wherein the information corresponds to at least one of: a profile description associated with the each of the second set of seed accounts, a content published by the second set of seed accounts, or a domain-specificity analysis of the second set of seed accounts;
  identifying a third subset of the second set of seed accounts associated with the domain-specific information based on a third user input; and
  determining the second plurality of seed accounts based on the identified the second subset and the third subset of the second set of seed accounts.

* * * * *